(12) United States Patent
Jung et al.

(10) Patent No.: US 12,408,228 B2
(45) Date of Patent: Sep. 2, 2025

(54) METHOD AND DEVICE FOR COLLECTING AND REPORTING MOBILITY HISTORY INFORMATION IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 17/796,774

(22) PCT Filed: Apr. 9, 2021

(86) PCT No.: PCT/KR2021/004502
§ 371 (c)(1),
(2) Date: Aug. 1, 2022

(87) PCT Pub. No.: WO2021/206508
PCT Pub. Date: Oct. 14, 2021

(65) Prior Publication Data
US 2023/0084366 A1 Mar. 16, 2023

(30) Foreign Application Priority Data

Apr. 9, 2020 (KR) .................. 10-2020-0043411
May 18, 2020 (KR) .................. 10-2020-0059373
Jul. 21, 2020 (KR) .................. 10-2020-0090212

(51) Int. Cl.
*H04W 76/27* (2018.01)
*H04W 76/10* (2018.01)

(52) U.S. Cl.
CPC ........... *H04W 76/27* (2018.02); *H04W 76/10* (2018.02)

(58) Field of Classification Search
CPC .............................. H04W 76/27; H04W 76/10
(Continued)

(56) References Cited

U.S. PATENT DOCUMENTS 9,813,964 B2 11/2017 Keskitalo et al.
10,212,637 B2 2/2019 Jung et al.
(Continued)

FOREIGN PATENT DOCUMENTS

CN 101867998 A 10/2010
CN 102547840 A 7/2012
(Continued)

OTHER PUBLICATIONS

TS38331, Radio Resource Control (RRC) protocol specification, 3GPP Technical Specification Group Radio Access Network, NR, 3GPP TS 38.331 V16.0.0, Mar. 2020 (Year: 2020).*
(Continued)

*Primary Examiner* — Nicholas R Taylor
*Assistant Examiner* — Chong G Kim
(74) *Attorney, Agent, or Firm* — Jefferson IP Law, LLP

(57) ABSTRACT

The present disclosure relates to a communication technology for fusing, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. The present disclosure may provide a method and a device for collecting and reporting mobility history information by a terminal in a next-generation mobile communication system.

15 Claims, 17 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,785,668 | B2 | 9/2020 | Kim et al. |
| 2015/0087313 | A1 | 3/2015 | Kim et al. |
| 2015/0208228 | A1 | 7/2015 | Koskinen et al. |
| 2016/0255565 | A1* | 9/2016 | Kim .................. H04W 36/0079 370/331 |
| 2017/0105136 | A1* | 4/2017 | Reider .................. H04W 24/10 |
| 2018/0317130 | A1 | 11/2018 | Jin et al. |
| 2019/0037635 | A1 | 1/2019 | Guo et al. |
| 2019/0254105 | A1* | 8/2019 | Kim ...................... H04W 76/27 |
| 2020/0351731 | A1 | 11/2020 | Kim et al. |
| 2021/0014664 | A1 | 1/2021 | Wu |
| 2021/0105605 | A1* | 4/2021 | Tsuboi .................... H04W 8/08 |
| 2021/0360449 | A1* | 11/2021 | Kim ...................... H04W 76/15 |

FOREIGN PATENT DOCUMENTS

| | | | |
|---|---|---|---|
| CN | 104272777 | A | 1/2015 |
| CN | 104521257 | A | 4/2015 |
| CN | 104602218 | A | 5/2015 |
| CN | 105684480 | A | 6/2016 |
| CN | 110351699 | A | 10/2019 |
| CN | 110612739 | A | 12/2019 |
| CN | 110731097 | A | 1/2020 |
| EP | 2 833 657 | A1 | 2/2015 |
| EP | 2 846 571 | A1 | 3/2015 |
| EP | 2 866 184 | A1 | 4/2015 |
| EP | 2 934 039 | A1 | 10/2015 |
| KR | 10-2073223 | B1 | 2/2020 |
| KR | 10-2020-0127405 | A | 11/2020 |

OTHER PUBLICATIONS

3rd Generation Partnership Project; Technical Specification Group Radio Access Network; NR; Radio Resource Control (RRC) protocol specification (Release 16), 3GPP TS 38.331 V16.1.0 (Jun. 2020), Jul. 17, 2020, XP051909380.

3rd Generation Partnership Project; Technical Specification Group Radio Access Network; NR; Radio Resource Control (RRC) protocol specification (Release 16), 3GPP TS 38.331 V16.1.0 (Jul. 2020), Jul. 24, 2020, XP051925836.

European Search Report dated Jul. 10, 2023, issued in European Application No. 21784544.5.

Huawei et al., CR for introducing MDT and SON, R2-2002003, 3GPP TSG-RAN WG2 Meeting #109-e, Mar. 11, 2022.

CMCC, UE capability for SON/MDT WI, R2-1915208, 3GPP TSG-RAN WG2 Meeting #108, USA, Nov. 8, 2019.

Huawei, Enhancements to UE history information, R3-197178, 3GPP TSG-RAN3 Meeting #106, Reno, Nevada, US, Nov. 8, 2019.

3GPP TS 38.331 V16.0.0, 3rd Generation Partnership Project, Technical Specification Group Radio Access Network, NR, Radio Resource Control (RRC) protocol specification, (Release 16), Apr. 6, 2020.

Chinese Office Action dated May 14, 2024, issued in Chinese Patent Application No. 202180027365.1.

Alcatel-Lucent (Rapporteur), Report of email discussion [84#31][LTE/Het-Net] Mobility information upon Idle->Connected, R2-140703, 3GPP TSG-RAN WG2#85, Feb. 13, 2014, Prague, Czech Republic.

Zhao Min, Yin Xueting, Zhao Yanhong, Design and application of Internet of Things overload control system based on LTE technology—improvement and application of e-commerce service model, Journal of Jiangxi Electric Power Vocational and Technical College, Mar. 28, 2018.

Chinese Office Action dated Sep. 29, 2024, issued in Chinese Application No. 202180027365.1.

Chinese Notice of Allowance dated Dec. 1, 2024, issued in Chinese Application No. 202180027365.1.

Korean Office Action dated Jun. 18, 2025, issued in Korean Application No. 10-2020-0090212.

* cited by examiner

METHOD AND DEVICE FOR COLLECTING AND REPORTING MOBILITY HISTORY INFORMATION IN NEXT-GENERATION MOBILE COMMUNICATION SYSTEM

TECHNICAL FIELD

The disclosure relates to UE and base station operations in a mobile communication system, and specifically relates to a method and a device for collecting and reporting mobility history information of a UE.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE system." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet is evolving from a human-centered connection network where humans generate and consume information to an Internet of Things (IoT) network that exchanges and processes information between distributed components such as things. The Internet of everything (IoE), which is a combination of IoT technology and big data processing technology through connection with a cloud server, has also emerged. Technology elements, such as "sensing technology", "wired/wireless communication and network infrastructure", "service interface technology", and "security technology" have been demanded for IoT implementation, therefore, technologies, such as a sensor network, machine-to-machine (M2M) communication, machine type communication (MTC) for a connection between things, are recently being studied. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology. Application of a cloud radio access network (cloud RAN) as the above-described big data processing technology may also be considered to be an example of convergence between the 5G technology and the IoT technology.

In case of network establishment or optimization, a mobile communication service provider measures signal strength in a usually expected service area, and based on this, disposes or readjusts base stations in the service area. The service provider loads signal measurement equipment in a vehicle, and collects cell measurement information in the service area, but this may require a lot of time and cost. Since the process is performed by usually using a vehicle, it may be generally called "drive test". In order to support operations, such as cell reselection or handover, and serving cell addition, during movement between cells, a UE is mounted with a function capable of measuring signals from a base station. Accordingly, a UE in a service area may be used instead of the drive test, and this may be called "minimization of drive test (MDT)". The service provider may configure an MDT operation to specific UEs through various configuration devices of a network, and the UEs may collect and store signal strength information from a serving cell and neighboring cells in an RRC connected mode (RRC_CONNECTED), an RRC idle mode (RRC_IDLE) or an RRC inactive mode (RRC_INACTUVE). In addition, the UEs may also store various pieces of information, such as location information, time information, and signal quality information. The stored information may be reported to the network when the UEs are in a connected mode, and the information may be transferred to a specific server.

DISCLOSURE OF INVENTION

Technical Problem

A cell is changed through a cell selection process, a cell reselection process, or a handover process, and a UE that supports storage of mobility history information may enter an out of service state (e.g., the UE does not camp on or access any cell, i.e., the UE is in any cell selection state, or does not camp on any suitable cell or any acceptable cell). Further, the UE may be in an RRC idle mode (RRC_IDLE mode), an RRC inactive mode (RRC_INACTIVE mode), or an RRC connected mode (RRC_CONNECTED mode). The mobile history information in NR may include both LTE and NR visit cell information, but how to include the LTE visit cell information is still incomplete. Further, in order to enhance implementation efficiency for the UE that stores the mobility history information, an "outside NR (e.g., it means all situations in which the UE does not access an NR cell itself)" is required to be updated.

Technical problems intended to be solved in the disclosure are not limited to the above-mentioned technical problems, and other unmentioned technical problems will be able to be clearly understood by those of ordinary skill in the art to which the disclosure pertains from the following description.

Solution to Problem

According to an embodiment of the disclosure, a method performed by a UE in a wireless communication system may include identifying whether transition is made from at least any one of an any cell selection state or a camped on any cell state to a camped normally state, determining time information spent in the at least any one of the any cell selection state or the camped on any cell state in case that it is identified that the transition is made to the camped normally state, storing the determined time information as mobility history information, and transmitting a message including the mobility history information to a base station.

Further, according to another embodiment of the disclosure, a method performed by a base station in a wireless communication system may include receiving a radio resource control (RRC) setup request message from a UE, transmitting an RRC setup message to the UE, receiving, from the UE, an RRC setup complete message including indication information indicating that mobility history information is available in case that the UE supports storage of the mobility history information, transmitting, to the UE, an information request message for the UE, and receiving, from the UE, a response message including the mobility history information in response to the information request message, wherein the mobility history information includes time information, and wherein the time information is determined based on the time information spent in any one of an any cell selection state or a camped on any cell state in case that it is identified that the UE is transitioned to a camped normally state.

Further, according to another embodiment of the disclosure, a UE in a wireless communication system may include a transceiver and a controller configured to identify whether transition is made from at least any one of an any cell selection state or a camped on any cell state to a camped normally state, determine time information spent in the at least any one of the any cell selection state or the camped on any cell state in case that it is identified that the transition is made to the camped normally state, store the determined time information as mobility history information, and control the transceiver to transmit a message including the mobility history information to a base station.

Further, according to another embodiment of the disclosure, a base station in a wireless communication system may include a transceiver and a controller configured to receive a radio resource control (RRC) setup request message from a UE through the transceiver, transmit an RRC setup message to the UE through the transceiver, receive, from the UE, an RRC setup complete message including indication information indicating that mobility history information is available in case that the UE supports storage of the mobility history information through the transceiver, transmit, to the UE, an information request message for the UE through the transceiver, and receive, from the UE, a response message including the mobility history information in response to the information request message through the transceiver, wherein the mobility history information includes time information, and wherein the time information is determined based on the time information spent in any one of an any cell selection state or a camped on any cell state in case that the UE is transitioned to a camped normally state.

Advantageous Effects of Invention

Through the method and the apparatus for collecting and reporting mobility history information proposed in the disclosure, it is possible to enhance the implementation efficiency for the UE that stores the mobility history information.

Effects that can be obtained in the disclosure are not limited to the above-mentioned effects, and other unmentioned effects will be able to be clearly understood by those of ordinary skill in the art to which the disclosure pertains from the following description.

MODE FOR THE INVENTION

Figure 1:
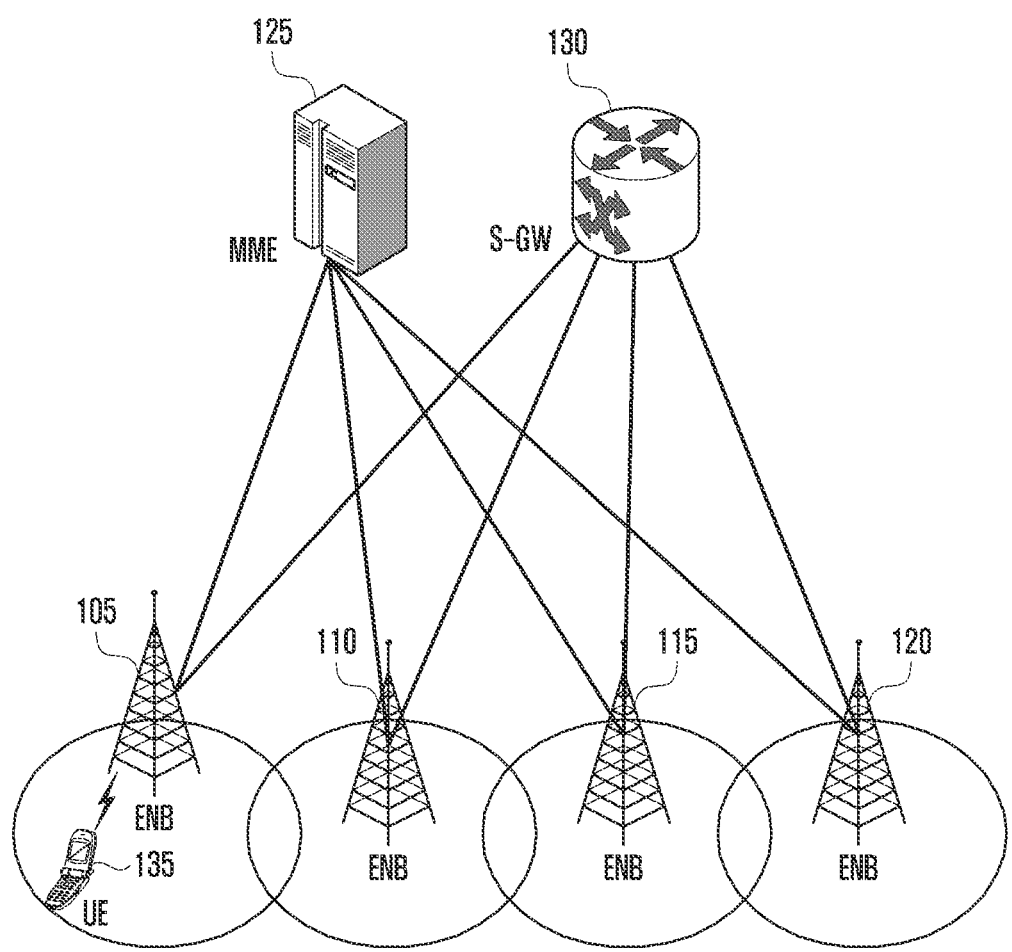
FIG. 1 is a diagram illustrating the structure of an LTE system according to an embodiment of the disclosure.

Hereinafter, embodiments of the disclosure will be described in detail with reference to the accompanying drawings.

In describing the embodiments, explanation of technical contents that are well known in the technical field to which the disclosure pertains and are not directly related to the disclosure will be omitted. This is to transfer the subject matter of the disclosure more clearly without obscuring the same through omission of unnecessary explanations.

For the same reason, in the accompanying drawings, some constituent elements may be exaggerated, omitted, or briefly illustrated. Further, sizes of the respective constituent elements do not completely reflect the actual sizes thereof, and in the drawings, the same reference numerals may be used for the same or corresponding constituent elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the embodiments of the disclosure are only specific details provided to assist those of ordinary skill in the art in a comprehensive understanding of the disclosure, and the disclosure is only defined within the scope of the appended claims. In the entire description of the disclosure, the same reference numerals are used for the same elements across various figures.

In this case, it will be understood that each block of the flowchart illustrations, and combinations of blocks in the flowchart illustrations, can be performed by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Further, in an embodiment, the "~units" may include one or more processors.

In the following description, a term to identify an access node, a term to denote network entities, a term to denote messages, a term to denote an interface between network entities, and a term to denote a variety of identity information have been illustrated for convenience in explanation. Accordingly, the disclosure is not limited to the following terms, and other terms to denote targets having equivalent technical meanings may be used.

For convenience in explanation, in the disclosure, terms and names defined in the 3rd Generation Partnership Project Long Term Evolution (3GPP LTE) standards are used. However, the disclosure is not restricted by the terms and names, and it may be equally applied to systems complying with other standards. In the disclosure, for convenience in explanation, "eNB" may be used interchangeably with "gNB". That is, a base station being described as "eNB" may represent "gNB".

FIG. 1 is a diagram illustrating the structure of an LTE system according to an embodiment of the disclosure.

With reference to FIG. 1, as illustrated, a radio access network of an LTE system may be composed of evolved node Bs (hereinafter referred to as "ENBs", "node Bs", or "base stations") 105, 110, 115, and 120, a mobility management entity (MME) 125, and a serving-gateway (S-GW) 130. User equipment (hereinafter referred to as "UE" or "terminal") 135 may access an external network through the ENBs 105 to 120 and the S-GW 130.

In FIG. 1, the ENBs 105 to 120 correspond to existing node Bs of a UMTS system. The ENBs are connected to the UE 135 on a radio channel, and play more complicated roles than those of the existing node Bs. In the LTE system, since all user traffics including a real-time service, such as a voice over IP (VoIP) through an Internet protocol, are serviced on shared channels, entities performing scheduling through gathering of state information, such as a buffer state, an available transmission power state, and a channel state of UEs, are necessary, and the ENBs 105 to 120 may take charge of this. In general, one ENB may control a plurality of cells. For example, in order to implement a transmission speed of 100 Mbps, the LTE system may use, for example, orthogonal frequency division multiplexing (hereinafter, referred to as "OFDM") as a radio access technology in a bandwidth of 20 MHz. Further, the LTE system may adopt an adaptive modulation & coding (hereinafter, referred to as "AMC") scheme that determines a modulation scheme and a channel coding rate to match the channel state of the UE. The S-GW 130 is an entity that provides a data bearer, and may generate or remove the data bearer under the control of the MME 125. The MME is an entity that takes charge of not only a mobility management function for the UE but also various kinds of control functions, and may be connected to the plurality of base stations.

Figure 2:
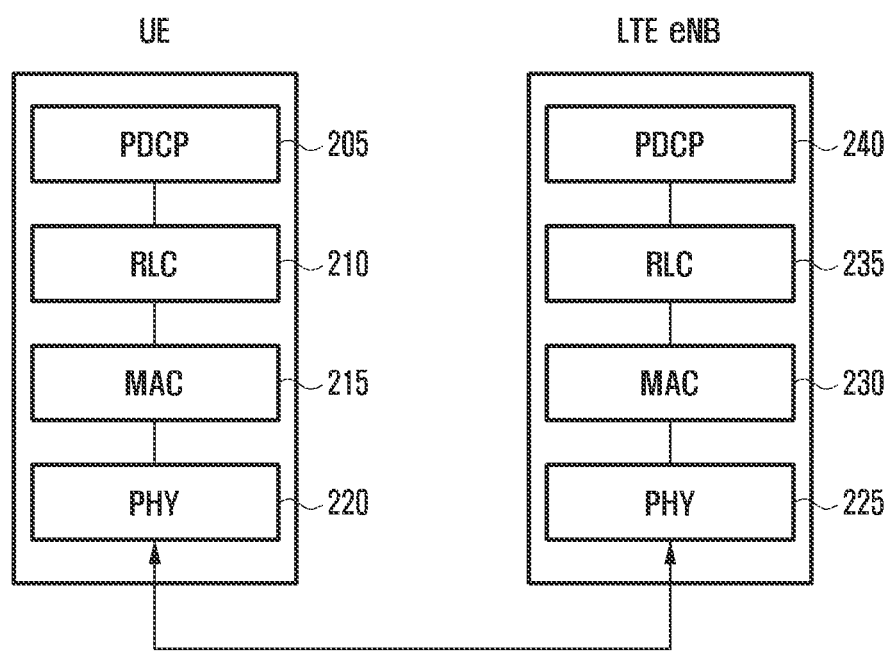
FIG. 2 is a diagram illustrating a radio protocol structure in an LTE system according to an embodiment of the disclosure.

FIG. 2 is a diagram illustrating a radio protocol structure in an LTE system according to an embodiment of the disclosure.

With reference to FIG. 2, in a UE or an ENB, a radio protocol of an LTE system is composed of a packet data convergence protocol (PDCP) 205 or 240, a radio link control (RLC) 210 or 235, and a medium access control (MAC) 215 or 230. The packet data convergence protocol (PDCP) 205 or 240 may take charge of IP header compression/decompression operations. The main functions of the PDCP may be summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink Radio link control (hereinafter, referred to as "RLC") 210 or 235 may perform an ARQ operation by reconfiguring a PDCP protocol data unit (PDCP PDU) with a suitable size. Main function s of the RLC may be summarized as follows.

Transfer of upper layer PDUs
Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 215 or 230 is connected to several RLC layer devices configured in one UE, and may perform multiplexing of RLC PDUs into the MAC PDU and demultiplexing of RLC PDUs from the MAC PDU. The main functions of the MAC may be summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The physical layer 220 or 225 may perform channel coding and modulation of upper layer data and make OFDM symbols to transmit the OFDM symbols on a radio channel, or may perform demodulation and channel decoding of the OFDM symbols received on the radio channel and transfer the OFDM symbols to an upper layer.

Figure 3:
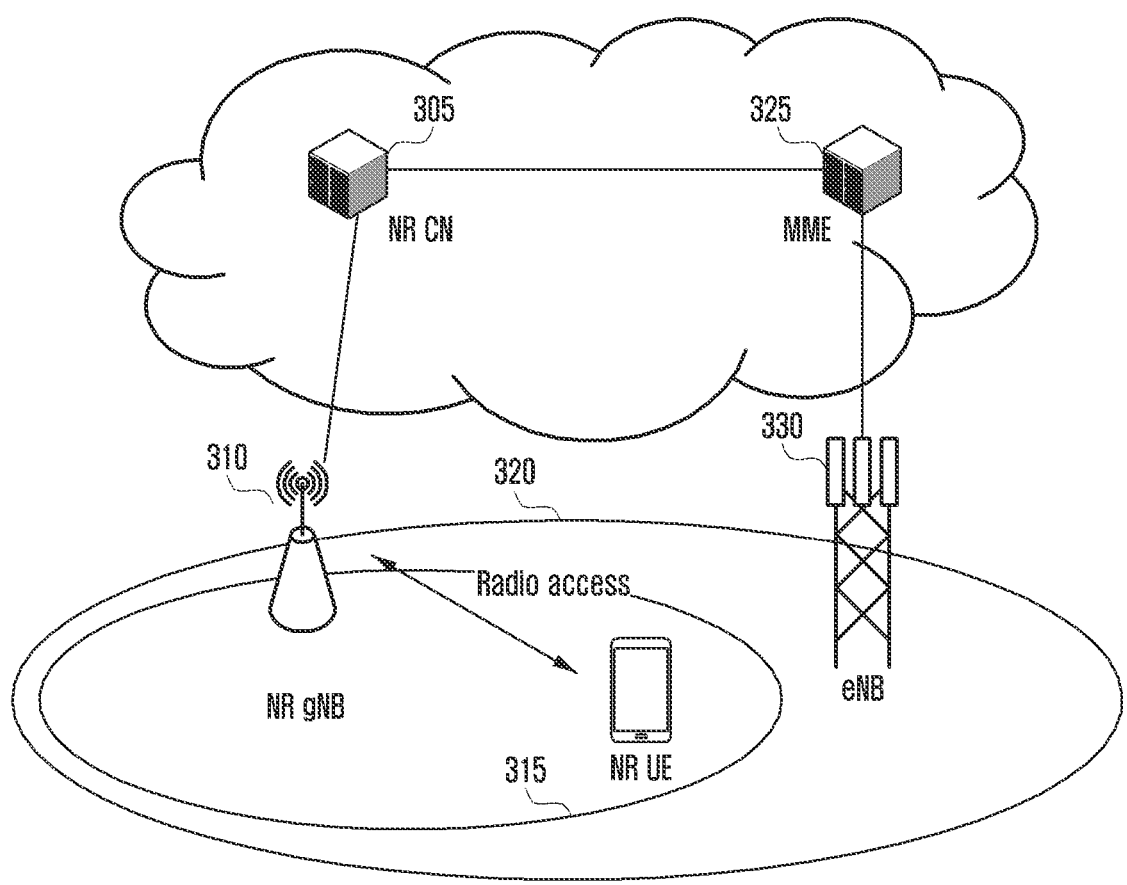
FIG. 3 is a diagram illustrating the structure of a next-generation mobile communication system according to an embodiment of the disclosure.

FIG. 3 is a diagram illustrating the structure of a next-generation mobile communication system according to an embodiment of the disclosure.

With reference to FIG. 3, as illustrated, a radio access network of the next-generation mobile communication system (hereinafter, NR or 2 g) may be composed of a new radio node B (hereinafter, NR gNB or NR base station) 310 and a new radio core network (NR CN) 305. New radio user equipment (hereinafter, NR UE or UE) 315 may access an external network through the NR gNB 310 and the NR CN 305.

In FIG. 3, the NR gNB 310 may correspond to an evolved Node B (eNB) of the existing LTE system. The NR gNB is connected to the NR UE 315 on a radio channel, and thus can provide a more superior service than the service of the existing Node B. In the next-generation mobile communication system, all user traffics are serviced on shared channels, and thus there is a need for a device that performs scheduling through consolidation of state information, such as a buffer state of UEs, an available transmission power state, and a channel state, and the NR gNB 310 may take charge of this. In general, one NR gNB 310 may control a plurality of cells. In order to implement ultrahigh-speed data transmission as compared with the existing LTE, a bandwidth that is equal to or higher than the existing maximum bandwidth may be applied, and a beamforming technology may be additionally used in consideration of the orthogonal frequency division multiplexing (hereinafter, referred to as "OFDM") as a radio access technology. Further, the NR gNB may adopt an adaptive modulation & coding (hereinafter, referred to as "AMC") scheme determining a modulation scheme and a channel coding rate to match the channel state of the UE. The NR CN 305 may perform functions of mobility support, bearer setup, and QoS configuration. The NR CN is a device that takes charge of not only a mobility management function for the UE but also various kinds of control functions, and may be connected to a plurality of base stations. Further, the next-generation mobile communication system may interlock with the existing LTE system, and the NR CN may be connected to an MME 325 through a network interface. The MME may be connected to an eNB 330 that is the existing base station.

Figure 4:
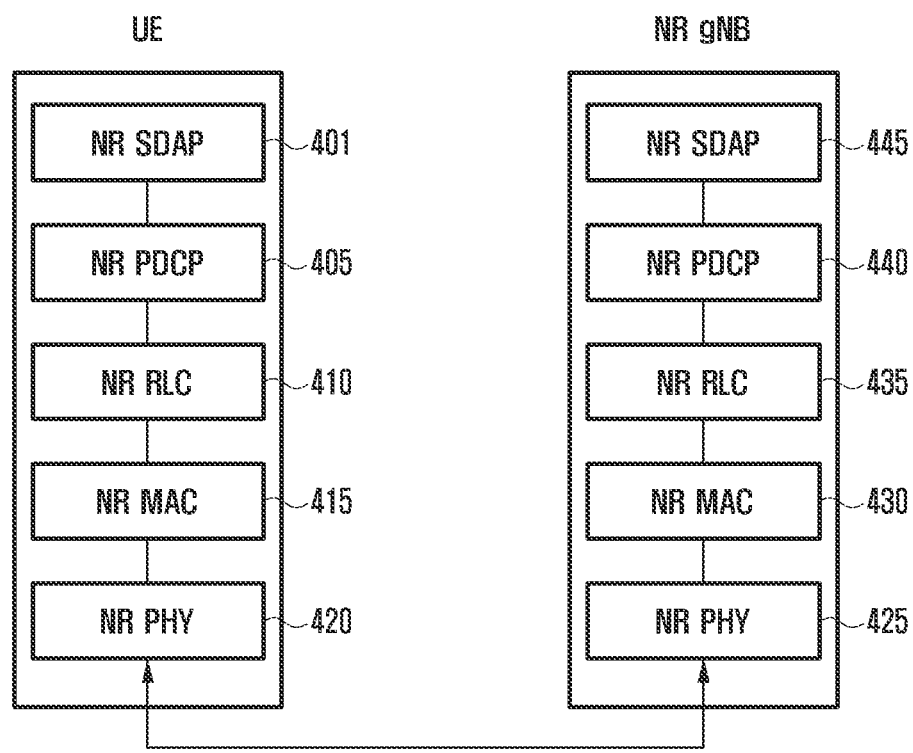
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of the disclosure.

With reference to FIG. 4, in the UE or NR base station, a radio protocol of the next-generation mobile communication system may include an NR SDAP 401 or 445, an NR PDCP 405 or 440, an NR RLC 410 or 435, an NR MAC 415 or 430, and an NR PHY 420 or 425.

The main functions of the NR SDAP 401 or 445 may include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs With respect to the SDAP layer device, the UE may be configured whether to use a header of the SDAP layer device or whether to use the function of the SDAP layer device for each PDCP layer device, bearer, or logical channel through an RRC message. If the SDAP header is configured, the UE may indicate that the UE can update or reconfigure mapping information on the uplink and downlink QoS flow and the data bearer through a NAS QoS reflective configuration 1-bit indicator (NAS reflective QoS) of the SDAP header and an AS QoS reflective configuration 1-bit indicator (AS reflective QoS). The SDAP header may include QoS flow ID information indicating the QoS. The QoS information may be used as a data processing priority for supporting a smooth service, scheduling information, and the like.

The main functions of the NR PDCP 405 or 440 may include some of the following functions.

Header compression and decompression: ROHC only
Transfer of user data
In-sequence delivery of higher layer PDUs
Out-of-sequence delivery of higher layer PDUs
PDCP PDU reordering for reception
Duplicate detection of lower layer SDUs
Retransmission of PDCP SDUs
Ciphering and deciphering
Timer-based SDU discard in an uplink As described above, reordering of the NR PDCP device may mean reordering of PDCP PDUs received from a lower layer based on PDCP sequence numbers (SNs), and may include transfer of data to an upper layer in the order of reordering or immediate transfer without considering the order. Further, the reordering may include recording of lost PDCP PDUs through rearrangement, status report for the lost PDCP PDUs to a transmission side, and retransmission request for the lost PDCP PDUs.

The main functions of the NR RLC 410 or 435 may include some of the following functions.

Transfer of upper layer PDUs
In-sequence delivery of higher layer PDUs
Out-of-sequence delivery of higher layer PDUs
Error correction through an ARQ
Concatenation, segmentation, and reassembly of RLC SDUs
Re-segmentation of RLC data PDUs
Reordering of RLC data PDUs
Duplicate detection
Protocol error detection
RLC SDU discard
RLC reestablishment As described above, in-sequence delivery of the NR RLC device may mean in-sequence delivery of RLC SDUs received from a lower layer to an upper layer. In case that one original RLC SDU is segmented into several RLC SDUs to be received, the in-sequence delivery of the NR RLC device may include reassembly and delivery of the RLC SDUs, reordering of the received RLC PDUs based on an RLC sequence number (SN) or a PDCP sequence number (SN), recording of lost RLC PDUs through reordering, status report for the lost RLC PDUs to a transmission side, retransmission request for the lost RLC PDUs. The in-sequence delivery of the NR RLC device may include in-sequence delivery of only RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if a specific timer has expired although there is the lost RLC SDU. The NR RLC device may process the RLC PDUs in the order of their reception (in the order of arrival, regardless of the order of a serial number or sequence number), and may transfer the processed RLC PDUs to the PDCP device in an out-of-sequence delivery manner. In case of receiving segments, the NR RLC device may receive the segments stored in a buffer or to be received later, reconfigure them as one complete RLC PDU, and then transfer the reconfigured RLC PDU to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device may mean a function of transferring the RLC SDUs received from a lower layer directly to an upper layer regardless of their order, and if one original RLC SDU is segmented into several RLC SDUs to be received, the out-of-sequence delivery of the NR RLC device may include reassembly and delivery of the RLC SDUs, and functions of storing and ordering the RLC SNs or PDCP SNs of the received RLC PDUs and recording of the lost RLC PDUs.

The NR MAC 415 or 430 may be connected to several NR RLC layer devices configured in one UE, and the main functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layer 420 or 425 may perform channel coding and modulation of upper layer data to configure and transmit OFDM symbols on a radio channel, or may perform demodulation and channel decoding of the OFDM symbols received on the radio channel to transfer the demodulated and channel-decoded symbols to an upper layer.

Figure 5:
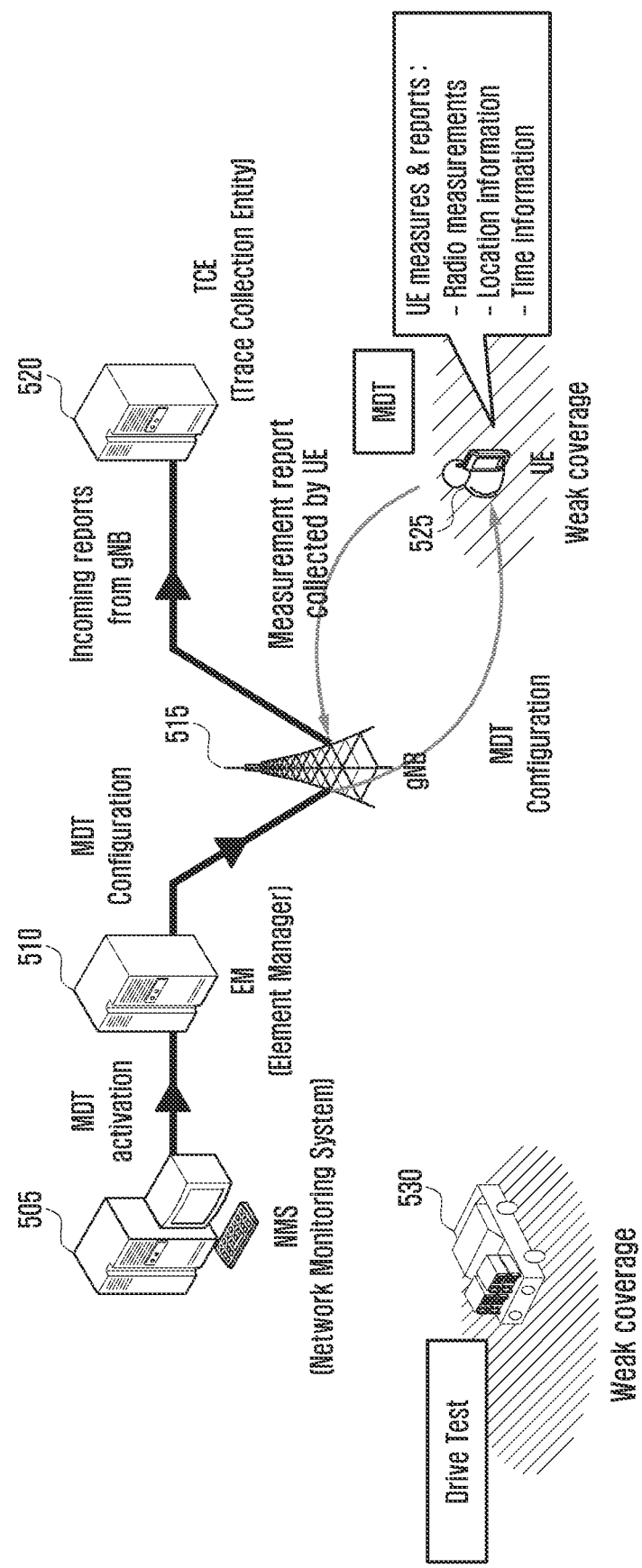
FIG. 5 is a diagram illustrating a method for collecting and reporting cell measurement information according to an embodiment of the disclosure.

FIG. 5 is a diagram illustrating a method for collecting and reporting cell measurement information according to an embodiment of the disclosure.

In case of network establishment or optimization, a mobile communication service provider may measure signal strength in a usually expected service area, and based on this, may dispose or readjust base stations in the service area. The service provider may load signal measurement equipment in a vehicle, and collect cell measurement information in the service area, but this may require a lot of time and cost. Since the process is performed by usually using a vehicle, it may be generally called "drive test". Further, in order to support operations, such as cell reselection or handover, and serving cell addition, during movement between cells, a UE is mounted with a function capable of measuring signals from a base station. Accordingly, a UE in a service area may be used instead of the drive test, and this may be called "minimization of drive test (MDT)". The service provider may configure an MDT operation to specific UEs through various configuration devices of a network, and the UEs may collect and store signal strength information from a serving cell and neighboring cells in an RRC connected mode (RRC_CONNECTED), an RRC idle mode (RRC_IDLE) or an RRC inactive mode (RRC_INACTIVE). In addition, the UEs may also store various pieces of information, such as location information, time information, and signal quality information. The stored information may be reported to the network when the UEs are in a connected mode, and the information may be transferred to a specific server.

The MDT operation may be briefly classified into an immediate MDT and al logged MDT.

The immediate MDT may be featured to immediately report the collected information to the network. Only a UE in an RRC connected mode can perform the immediate report. In general, a radio resource management (RRM) measurement process may be reused to support operations of handover and serving cell addition, and location information and time information may be additionally reported.

The logged MDT may be featured to store the collected information without immediate report to the network, and thereafter, the UE reports the stored information after being switched to the RRC connected mode. In general, a UE in an RRC idle mode or RRC inactive mode, which is unable to immediately report to the network, may perform the logged MDT. In the disclosure, the UE in the RRC inactive mode introduced in the next-generation mobile communication system may be featured to perform the logged MDT. When a specific UE is in an RRC connected mode, the network may provide configuration information for performing the logged MDT operation to the UE, and the UE may collect and store the configured information after being switched to the RRC idle mode or the RRC inactive mode. This is related to Table 1 below.

TABLE 1

| | RRC state |
|---|---|
| Immediate MDT | RRC_CONNECTED |
| Logged MDT | RRC_IDLE, RRC_INACTIVE |

Figure 6:
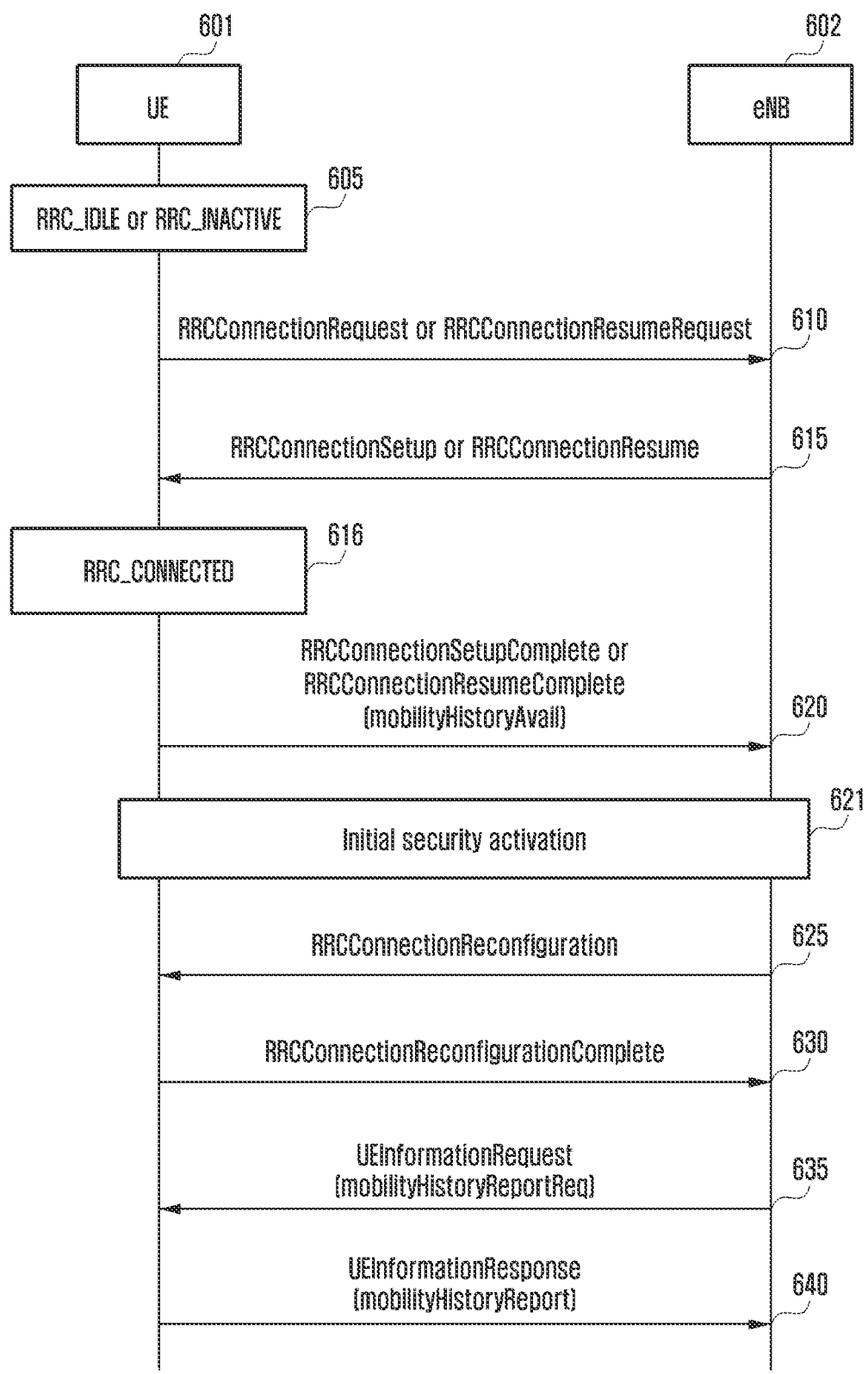
FIG. 6 is a diagram illustrating an operation between a UE and a base station for the UE to report mobility history information to an LTE base station in an LTE system in the related art according to an embodiment of the disclosure.

FIG. 6 is a diagram illustrating an operation between a UE and a base station for the UE to report mobility history information to an LTE base station in an LTE system in the related art according to an embodiment of the disclosure.

With reference to FIG. 6, a UE 601 may be in an RRC idle mode (RRC_IDLE) or an RRC inactive mode (RRC_INACTIVE).

The UE 601 in the RRC idle mode may transmit an RRC connection request message ((RRCConnectionRequest) to a base station in order to perform an RRC connection setup procedure with the base station 602 (610). In response to this, the base station having received the RRC connection request message may transmit an RRC connection setup message (RRCConnectionSetup) to the UE (615). The UE having received the RRC connection setup message may apply this, and may be transitioned to the RRC connected mode (616). Further, the UE in the RRC connected mode may transmit an RRC connection setup complete message (RRCConnectionSetupComplete) to the base station (620). If the UE supports storage of mobility history information and the UE has mobility history information available in VarMobilityHistoryReport, the UE may include a mobilityHistoryAvail indicator indicating that the mobility history information is available in the RRC connection setup completion message to be transmitted to the base station (620).

The UE 601 in the RRC inactive mode may transmit, to the base station, an RRC connection resume request message (RRCConnectionResumeRequest) to perform an RRC connection resume procedure with the base station 602 (610). In response to this, the base station having received the RRC connection resume request message may transmit an RRC connection resume message (RRCConnectionResume) to the UE (615). The UE having received the RRC connection setup message may apply this, and may be transitioned to the RRC connection mode (616). Further, the UE in the RRC connected mode may transmit an RRC connection resume complete message (RRCConnectionResumeComplete) to the base station (620). If the UE supports storage of mobility history information and the UE has mobility history information available in VarMobilityHistoryReport), the UE may include the mobilityHistoryAvail indicator in the RRC connection resume complete message to be transmitted to the base station (620).

The UE 601 that has not yet made security settings may perform an initial security activation procedure with the base station 602 (621). As an example, the UE that has not yet made security settings may mean a UE that has been switched from the RRC idle mode to the RRC connected mode. Specifically, the UE 601 may transmit a security mode command message (SecurityModeCommand) to the base station 602, and in response to this, the base station may transmit a security mode complete message (SecurityModeComplete) to the UE.

At operation 625, in order to perform an RRC connection reconfiguration procedure, the base station 602 may transmit an RRC connection reconfiguration message (RRCConnectionReconfiguration) to the UE 601 in an RRC connected mode. The UE applies the received RRC connection reconfiguration message, and in response to this, may transmit an RRC connection reconfiguration complete message (RRCConnectionReconfigurationComplete) to the base station (630).

At operation 635, the base station 602 may perform UE information collection procedure in case of having successfully performed security activation. In order to request mobility history information from the UE 601, the base station 602 may transmit a UE information request message (UEInformationRequest) to the UE (635). In order to request the mobility history information, the UE information request message may include a MobilityHistoryReportReq indicator.

At operation 640, the UE 601 having successfully performed the security activation may transmit a UE information response message (UEInformationResponse) to the base station 602 (640). If the mobilityHistoryReportReq is set to "true" in the received UE information request message, the UE may perform the following series of procedures.

The UE may include the mobilityHistoryReport and set it to include entries from VarMobilityHistoryReport.
The UE may include in the mobilityHistoryReport an entry for the current cell, possibly after removing the oldest entry if required, set its fields as follows.
The UE may set visitedCellId to the global cell identity of the current cell.
The UE may set field timeSpent to the time spent in the current cell.

By performing the above procedures, the UE may include the mobilityHistoryReport in the UE information response message, and may transmit the UE information response message to the base station (640).

Figure 7:
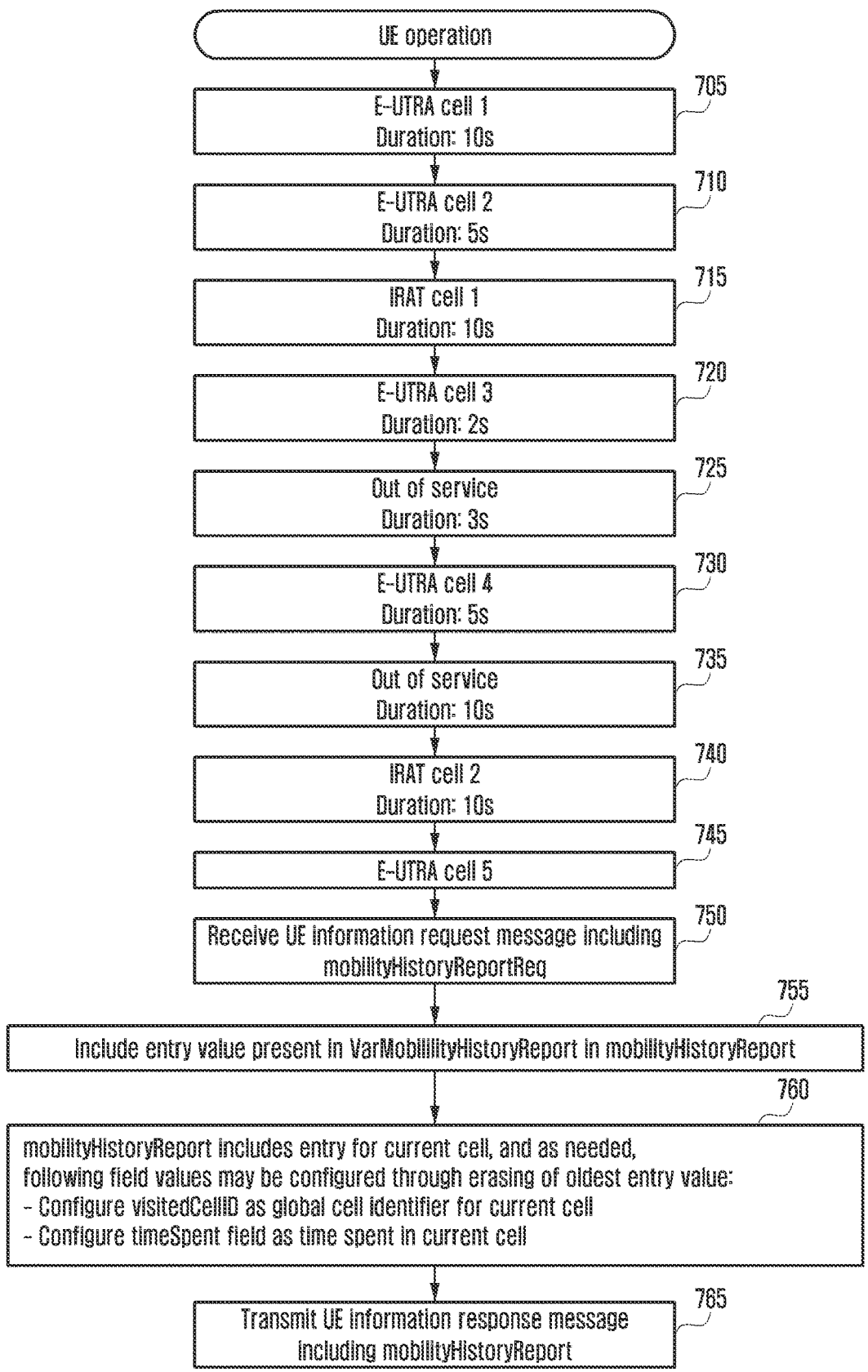
FIG. 7 is a diagram illustrating an operation of a UE for reporting mobility history information to a base station in an LTE system in the related art according to an embodiment of the disclosure.

FIG. 7 is a diagram illustrating an operation of a UE for reporting mobility history information to a base station in an LTE system in the related art according to an embodiment of the disclosure.

A UE that supports storage of mobility history information may enter an out of service state (e.g., the UE does not camp on or access any cell, i.e., the UE is in any cell selection state, or does not camp on any suitable cell or any acceptable cell), and the cell is changed through a cell selection process, a cell reselection process, or a handover process. In this case, the UE may be in an RRC idle mode (RRC_IDLE), an RRC inactive mode (RRC_INACTIVE), or an RRC connected mode (RRC_CONNECTED). The UE may store the mobility history information in VarMobilityHistoryReport in accordance with the following conditions.

Condition 1-1: Upon change of E-UTRA cell, consisting of PCell in RRC_CONNECTED or serving cell in RRC_IDLE, to another E-UTRA or inter-RAT cell or when entering out of service from E-UTRA cell Condition 1-2: Upon change of E-UTRA cell, consisting of PCell in RRC_CONNECTED or serving cell in RRC_IDLE or RRC_INACTIVE, to another E-UTRA or inter-RAT cell or when entering out of service from E-UTRA cell Condition 2-1: Upon entering E-UTRA (in RRC_CONNECTED or RRC_IDLE) while previously out of service and/or using another RAT Condition 2-2: Upon entering E-UTRA (in RRC_CONNECTED or RRC_IDLE or RRC_INACTIVE) while previously out of service and/or using another RAT In case that the UE stores the mobility history information in varMobility HistoryReport in accordance with condition 1-1 or condition 1-2, the UE may include an entry in variable VarMobilityHistoryReport possibly after removing the oldest entry, if necessary, according to following.

If the global cell identity of the previous PCell/serving cell is available, the UE may include the global cell identity of that cell in the field visitedCellId of the entry. Else, the UE may include the physical cell identity and carrier frequency of the previous PCell/serving cell in the field visitedCellId of the entry. Further, the UE may set the field timeSpent of the entry as the time spent in the previous PCell/serving cell.

The difference between condition 1-1 and condition 1-2 is whether the UE stores the mobility history information occurring in the RRC inactive mode. The difference is that the UE that stores the mobility history information in VarMobilityHistoryReport in accordance with condition 1-1 does not store the mobility history information occurring in the RRC inactive mode in the VarMobilityHistoryReport, and the UE that stores the mobility history information in the VarMobilityHistoryReport in accordance with condition 1-2 stores the mobility history information occurring in the RRC inactive mode in the VarMobilityHistoryReport. Accordingly, the UE that stores the mobility history information in the VarMobilityHistoryReport in accordance with condition 1-2 has the advantage of being capable of reporting more accurate mobility history information to the base station as compared with condition 1-1.

In case that the UE stores the mobility history information in the VarMobilityHistoryReport in accordance with condition 2-1 or condition 2-2, the UE may include an entry in variable VarMobilityHistoryReport possibly after removing the oldest entry, if necessary, according to following.

The UE may set the field timeSpent of the entry as the time spent outside E-UTRA. The time spent outside the E-UTRA may mean the time spent in the out of service, or the time when another RAT that is not the E-UTRA cell is used, or the sum of the time spent in the out of service and the time when another RAT that is not the E-UTRA cell is used.

The difference between condition 2-1 and condition 2-2 is whether the UE stores the mobility history information occurring in the RRC inactive mode. The difference is that the UE that stores the mobility history information in VarMobilityHistoryReport in accordance with condition 2-1 does not store the mobility history information occurring in the RRC inactive mode in the VarMobilityHistoryReport, and the UE that stores the mobility history information in the VarMobilityHistoryReport in accordance with condition 2-2 stores the mobility history information occurring in the RRC inactive mode in the VarMobilityHistoryReport. Accordingly, the UE that stores the mobility history information in the VarMobilityHistoryReport in accordance with condition 2-2 has the advantage of being capable of reporting more accurate mobility history information to the base station as compared with condition 1-1.

With reference to FIG. 7, the UE may store the mobility history information in the VarMobilityHistoryReport in the above-described operations through operations 705 to 745. As an example, the UE may store at least one of the following information in the VarMobilityHistoryReport.

Global cell identity, or a carrier frequency and a physical cell identity for E-UTRA cell 1, and time 10 s spent in E-UTRA cell 1 (705)

Global cell identity, or a carrier frequency and a physical cell identity for E-UTRA cell 2, and time 5 s spent in E-UTRA cell 2 (710)

Time 10 s spent in IRAT (inter-RAT) cell 1 (715)

Global cell identity, or a carrier frequency and a physical cell identity for E-UTRA cell 3, and time 2 s spent in E-UTRA cell 3 (720)

Time 3 s spent in out of service (725)

Global cell identity, or a carrier frequency and a physical cell identity for E-UTRA cell 4, and time 5 s spent in E-UTRA cell 4 (730)

Total time 20 s spent in out of service and IRAT cell 2 (735 and 740)

For reference, the global cell identity for the E-UTRA cell may mean the following information as in the following Table 2.

TABLE 2

- CellGlobalIdEUTRA
The IE *CellGlobalIdEUTRA* specifies the Evolved Cell Global Identifier (ECGI), the globally unique identity of a cell in E-UTRA.
*CellGlobalIdEUTRA* information element
-- ASN1START
CellGlobalIdEUTRA ::=     SEQUENCE {
  plan-Identity            PLMN-Identity,
  cellIdentity             CellIdentity
}
-- ASN1STOP ■ CellGlobalIdEUTRA field descriptions ■ *cellIdentity*
Identity of the cell within the context of the PLMN
■ *plmn* -Identity
Identifies the PLMN of the cell as given by the first PLMN entry in the *plmn-IdentityList* in SystemInformationBlockType1.

At operation 745, the UE in the RRC connected mode may be connected to E-UTRA cell 5 as PCell (primary cell). At operation 750, the UE may receive a UE information request message including mobilityHistoryReportReq from an LTE base station. If mobilityHistoryReportReq is set to true, the UE, at operation 755, may include the mobilityHistoryReport and set it to include entries from VarMobilityHistoryReport.

At operation 760, if necessary, the UE may remove the oldest entry value, if possible, from the current cell (e.g., E-UTRA cell 5), and may include the global cell identity for the current cell (E-UTRA cell 5) for entries present in the VarMobilityHistoryReport and the time spent in E-UTRA cell 5 in the mobilityHistoryReport.

At operation 765, the UE may include the above-described mobilityHistoryReport in the UE information response message and may transmit the UE information response message to the LTE base station.

Figure 8:
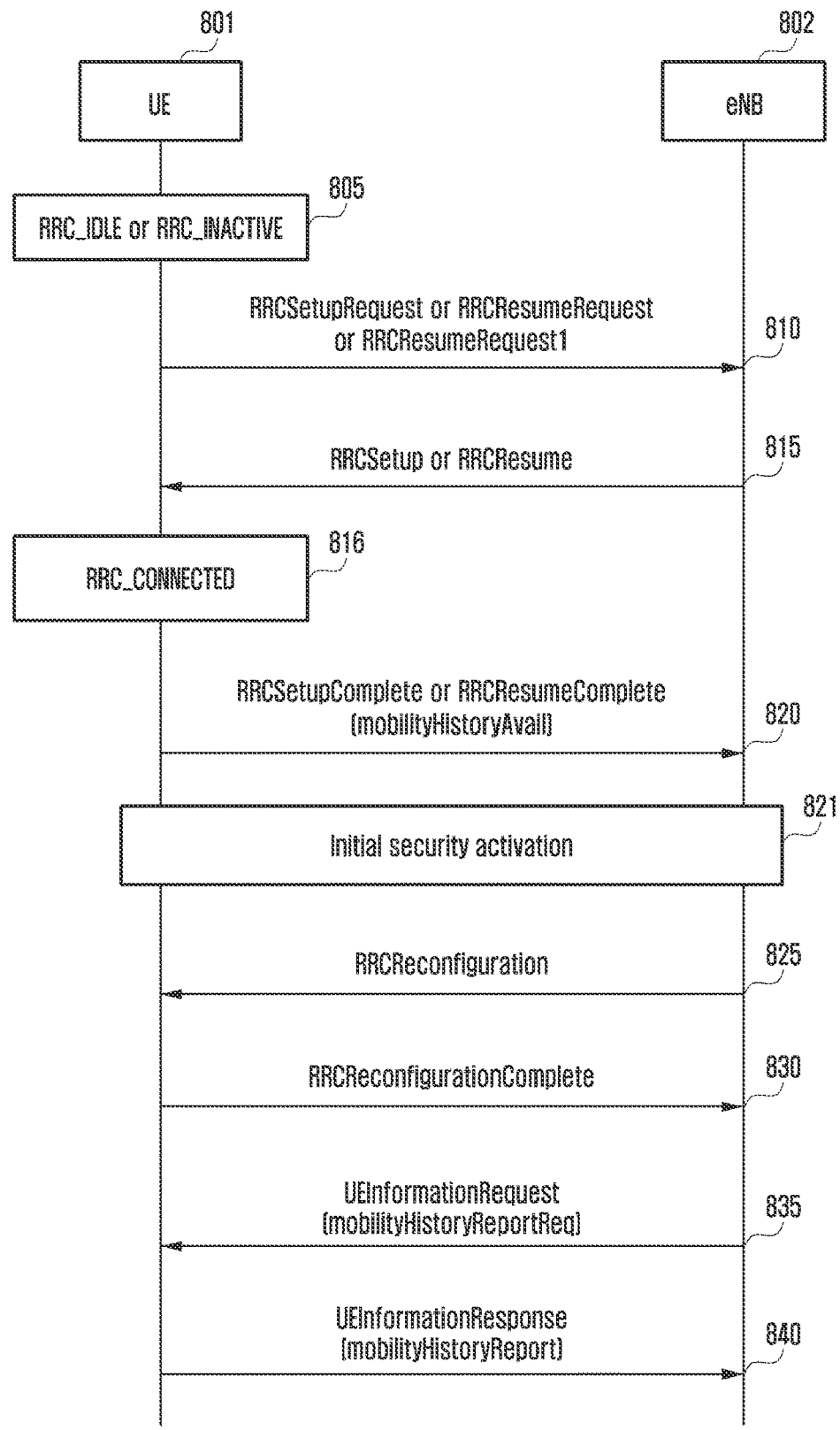
FIG. 8 is a diagram illustrating an operation between a UE and a base station for the UE to report mobility history information to an NR base station in a next-generation mobile communication system according to an embodiment of the disclosure.

FIG. 8 is a diagram illustrating an operation between a UE and a base station for the UE to report mobility history information to an NR base station in a next-generation mobile communication system according to an embodiment of the disclosure.

With reference to FIG. 8, the UE 801 may be in an RRC idle mode (RRC_IDLE) or in an RRC inactive mode (RRC_INACTIVE).

In order to perform an RRC connection setup procedure with the base station 802, the UE 801 in the RRC idle mode may transmit an RRC connection setup request message (RRCSetupRequest) to the base station (810). In response to this, the base station having received the RRC connection setup message may transmit an RRC connection setup message (RRCSetup) to the UE (815). The UE having received the RRC connection setup message may apply this, and may be transitioned to an RRC connection mode (816). Further, the UE in the RRC connection mode may transmit an RRC connection setup complete message (RRCSetupComplete) to the base station (820). If the UE supports storage of mobility history information and the UE has mobility history information available in VarMobilityHistoryReport, the UE may include a mobilityHistoryAvail indicator in the RRC connection setup complete message to be transmitted to the base station (820).

In order to perform an RRC connection resume procedure with the base station 802, the UE 801 in the RRC inactive mode may transmit an RRC connection resume request message or an RRC connection resume request 1 message (RRCResumeRequest or RRCResumeRequest1) to the base station (810). In response to this, the base station having received the RRC connection resume request message may transmit an RRC connection resume message (RRCResume) to the UE (815). The UE having received the RRC connection resume message may apply this, and may be transitioned to an RRC connection mode (816). Further, the UE in the RRC connection mode may transmit an RRC connection resume complete message (RRCResumeComplete) to the base station (820). If the UE supports storage of mobility history information and the UE has mobility history information available in VarMobilityHistoryReport, the UE may include a mobilityHistoryAvail indicator in the RRC connection resume complete message to be transmitted to the base station 820.

The UE 801 that has not yet made security settings may perform an initial security activation procedure with the base station 802 (821). As an example, the UE that has not yet made security settings may mean a UE that has been switched from the RRC idle mode to the RRC connected mode. Specifically, the UE 801 may transmit a security mode command message (SecurityModeCommand) to the base station 802, and in response to this, the base station may transmit a security mode complete message (SecurityModeComplete) to the UE.

At operation 825, in order to perform an RRC connection reconfiguration procedure, the base station 802 may transmit an RRC connection reconfiguration message (RRCReconfiguration) to the UE 801 in the RRC connected mode. The UE applies the received RRC connection reconfiguration message, and in response to this, may transmit an RRC connection reconfiguration complete message (RRCReconfigurationComplete) to the base station (830).

At operation 835, the base station 802 may perform UE information collection procedure in case of having successfully performed security activation. In order to request mobility history information from the UE 801, the base station 802 may transmit a UE information request message (UEInformationRequest) to the UE (835). In order to request the mobility history information, the UE information request message may include a MobilityHistoryReportReq indicator.

At operation 840, the UE 801 having successfully performed the security activation may transmit a UE information response message (UEInformationResponse) to the base station 802 (840). If the mobilityHistoryReportReq is set to "true" in the received UE information request message, the UE may perform the following series of procedures.

The UE may include the mobilityHistoryReport and set it to include entries from VarMobilityHistoryReport.

The UE may include in the mobilityHistoryReport an entry for the current cell, possibly after removing the oldest entry if required, set its fields as follows.

The UE may set visitedCellId to the global cell identity of the current cell.

The UE may set field timeSpent to the time spent in the current cell.

By performing the above procedures, the UE may include the mobilityHistoryReport in the UE information response message, and may transmit the UE information response message to the base station (840).

Figure 9:
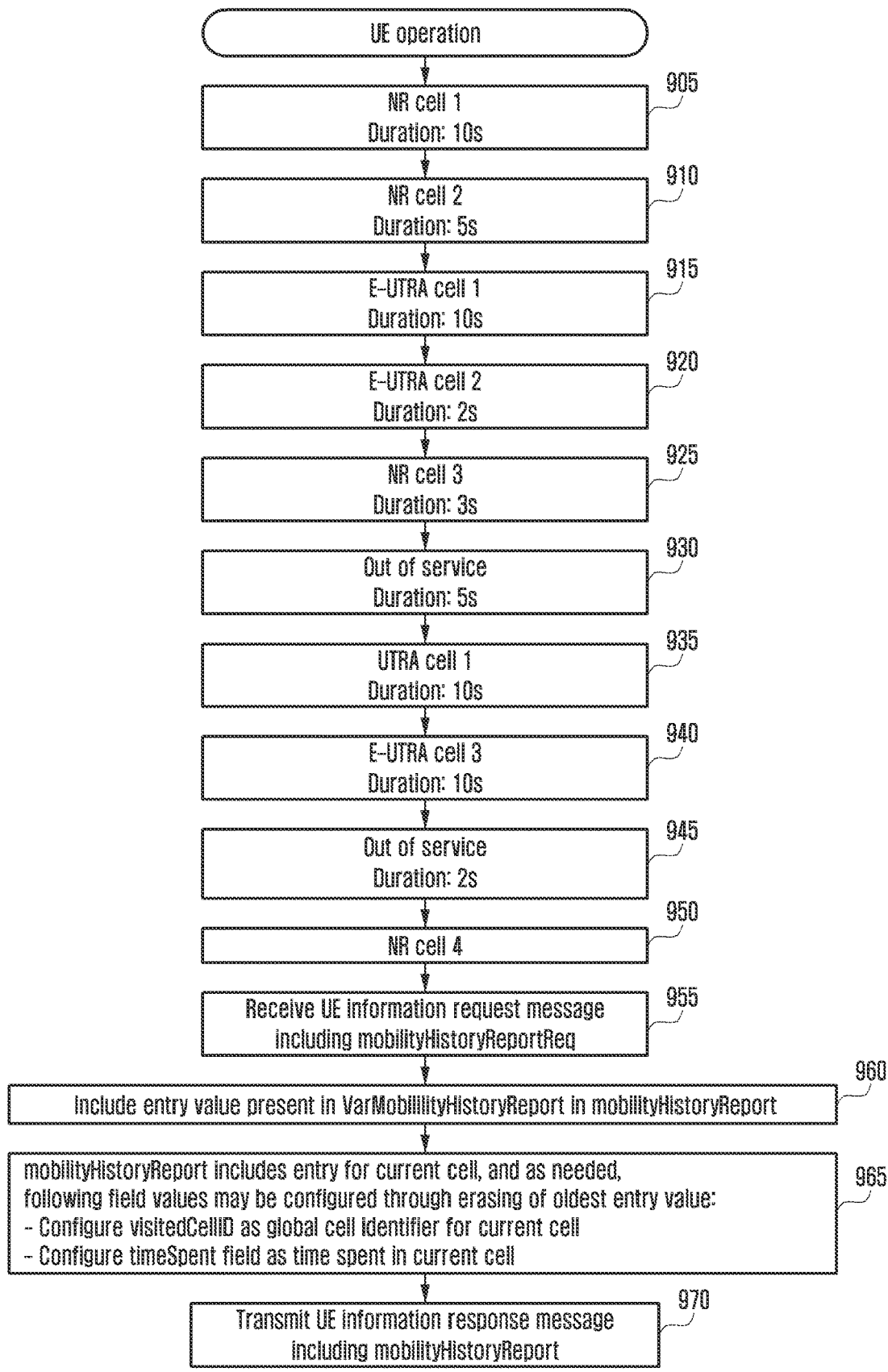
FIG. 9 is a diagram illustrating an operation of a UE for reporting mobility history information to an NR base station in a next-generation mobile communication system according to an embodiment of the disclosure.

FIG. 9 is a diagram illustrating an operation of a UE for reporting mobility history information to an NR base station in a next-generation mobile system according to an embodiment of the disclosure.

A UE that supports storage of mobility history information may enter an out of service state (e.g., the UE does not camp on or access any cell, i.e., the UE is in any cell selection state, or does not camp on any suitable cell or any acceptable cell) in case that the cell is changed through a cell selection process, a cell reselection process, or a handover process. The UE may be in an RRC idle mode (RRC_IDLE), an RRC inactive mode (RRC_INACTIVE), or an RRC connected mode (RRC_CONNECTED). The UE may store the mobility history information in VarMobilityHistoryReport of NR in case that the following conditions are satisfied.

Condition 1: Upon change of cell, consisting of PCell in RRC_CONNECTED or serving cell in RRC_IDLE or RRC_INACTIVE (for NR cell), to another NR or E-UTRA or when entering out of service from NR cell Condition 2: Upon entering NR (in RRC_CONNECTED or RRC_IDLE or RRC_INACTIVE) while previously out of service Condition 3: Upon entering NR (in RRC_CONNECTED or RRC_IDLE or RRC_INACTIVE) while using E-UTRA In case that the UE satisfies condition 1, and stores mobility history information in varMobilityHistoryReport of NR, the UE may include an entry in variable VarMobilityHistoryReport possibly after removing the oldest entry, if necessary, according to following.

If the global cell identity of the previous PCell/serving cell is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

In case that the UE satisfies condition 2, and stores the mobility history information in the VarMobilityHistoryReport of NR, the UE may include an entry in variable VarMobilityHistoryReport possibly after removing the oldest entry, if necessary, according to following.

The UE may set the field timeSpent of the entry as the time spent out of service.

If condition 2 is satisfied, the UE according to an embodiment of the disclosure may propose to store only the time spent in out of service in the timeSpent field. That is, unlike the LTE system in the related art, the UE may be featured not to store the time spent in an inter-RAT cell (E-UTRA cell and/or UTRA cell) in the timeSpent field. Unlike the LTE system in the related art, in case of storing only the time spent in out of service in the timeSpent field, the mobility history information of the UE may be inaccurate. However, the UE has the advantage that it can separately manage VarMobilityHistoryReport for the LTE and VarMobilityHistoryReport for the NR. That is, since the time spent in an inter-RAT cell (E-UTRA cell and/or UTRA cell) is separately stored and managed in the VarMobilityHistoryReport for the LTE, it is not separately stored in the VarMobilityHistoryReport for the NR, and thus implementation efficiency for the UE that stores the mobility history information can be enhanced. As an example, in order to reflect the real mobility history information of the UE, the UE is not required to rearrange the order of the VarMobilityHistoryReport for the LTE and the VarMobilityHistoryReport for the NR.

In case that the UE satisfies condition 3, and stores the mobility history information in the VarMobilityHistoryReport of NR, the UE may include an entry in variable VarMobilityHistoryReport possibly after removing the oldest entry, if necessary, according to following.

If the global cell identity of the previous PCell/serving cell (information about E-UTRA cell) is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

If condition 3 is satisfied, the UE according to an embodiment of the disclosure may be featured to store only the latest E-UTRA cell information in the VarMobilityHistoryReport of the NR. As an example, in case of changing a cell from E-UTRA cell a to E-UTRA cell b, and changing the cell from E-UTRA cell b to an NR cell, the UE may be featured to store only information about E-UTRA cell b in the VarMobilityHistoryReport of the NR. That is, since the information about E-UTRA cell a is stored in the VarMobilityHistoryReport of the LTE, and the information about E-UTRA cell a is not stored in the VarMobilityHistoryReport of the NR, the mobility history information of the UE may be inaccurate, but it is advantageous that the UE can separately manage the VarMobilityHistoryReport of the LTE and the VarMobilityHistoryReport of the NR. That is, since the information about E-UTRA cell a is stored in the VarMobilityHistoryReport for the LTE and only the information about E-UTRA cell b is stored in the VarMobilityHistoryReport of the NR, the implementation efficiency for the UE that stores the mobility history information can be enhanced. As an example, in order to reflect the real mobility history information of the UE, the UE is not required to rearrange the order of the VarMobilityHistoryReport for the LTE and the VarMobilityHistoryReport for the NR.

With reference to FIG. 9, the UE may store the mobility history information in the VarMobilityHistoryReport of the NR in the above-described operations through operations 905 to 945. As an example, the UE may store at least one of the following information in the VarMobilityHistoryReport of the NR.

Global cell identity, or a carrier frequency and a physical cell identity for NR cell 1, and time 10 s spent in NR cell 1 (905)

Global cell identity, or a carrier frequency and a physical cell identity for NR cell 2, and time 5 s spent in NR cell 2 (910)

Global cell identity, or a carrier frequency and a physical cell identity for E-UTRA cell 2, and time 2 s spent in E-UTRA cell 2 (920)

Global cell identity, or a carrier frequency and a physical cell identity for NR cell 3, and time 3 s spent in NR cell 3 (925)

Time 2 s spent in out of service (945)

For reference, the UE according to the embodiment may be featured not to include the following information in the VarMobilityHistoryReport of the NR.

Global cell identity, or a carrier frequency and a physical cell identity for E-UTRA cell 1, and time 10 s spent in E-UTRA cell 1 (915)

Time 5 s spent in out of service (930)

Time 10 s spent in E-UTRA cell 1 (935)

Global cell identity, or a carrier frequency and a physical cell identity for E-UTRA cell 3, and time 10 s spent in E-UTRA cell 3 (940)

In the UE according to an embodiment of the disclosure, the global cell identity for the E-UTRA cell may follow the above-described embodiment, and the global cell identity for the NR cell may mean the following information as in the following Table 3.

TABLE 3

- CGI-Info-Logging
The IE CGI-Info-Logging indicates the NR Cell Global Identifier (NCGI), the globally unique identity of a cell in NR.
    CGI-Info-Logging information element
-- ASN1START
-- TAG-CGI-INFO-LOGGING-START
CGI-Info-Logging-r16 ::=                      SEQUENCE {
  plm-Identity                              PLMN-Identity,
  cellIdentity                              CellIdentity
}
-- TAG-CGI-INFO-LOGGING-STOP
-- ASN1STOP
CGI-Info-Logging field descriptions cellIdentity
Unambiguously identify a cell within a PLMN and it belongs the first PLMN-IdentityInfo IE of PLMN-IdentityInfoList in SIB1.
plmn-Identity
Identifies the PLMN of the cell for the reported cellIdentity: the first PLMN-Identity in plmn-IdentityList in SIB1.

At operation 950, the UE in the RRC connected mode may be connected to NR cell 4 as PCell (primary cell). At operation 955, the UE may receive a UE information request message including mobilityHistoryReportReq from an NR base station. If mobilityHistoryReportReq is set to true, the UE, at operation 960, may include the mobilityHistoryReport and set it to include entries from VarMobilityHistoryReport.

At operation 965, if necessary, the UE may remove the oldest entry value, if possible, from the current cell (e.g., NR cell 4), and may include the global cell identity for the current cell (NR cell 4) for entries present in the VarMobilityHistoryReport and the time spent in NR cell 4 in the mobilityHistoryReport.

At operation 970, the UE may include the above-described mobilityHistoryReport in the UE information response message and may transmit the UE information response message to the NR base station.

Figure 10:
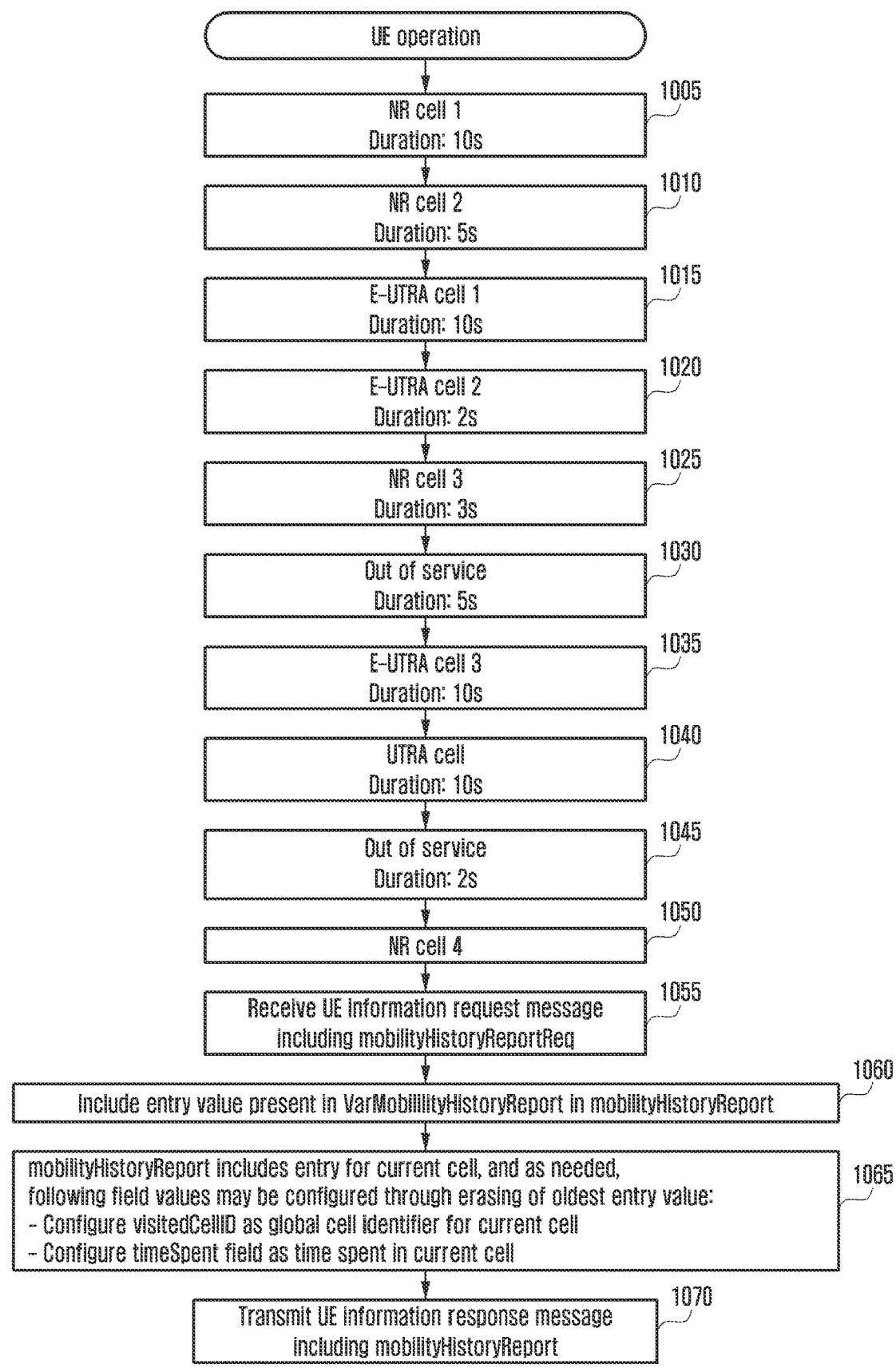
FIG. 10 is a diagram illustrating an operation of a UE for reporting mobility history information to an NR base station in a next-generation mobile communication system according to an embodiment of the disclosure.

FIG. 10 is a diagram illustrating an operation of a UE for reporting mobility history information to an NR base station in a next-generation mobile system according to an embodiment of the disclosure.

A UE that supports storage of mobility history information may enter an out of service state (e.g., the UE does not camp on or access any cell, i.e., the UE is in any cell selection state, or does not camp on any suitable cell or any acceptable cell) in case that the cell is changed through a cell selection process, a cell reselection process, or a handover process. The UE may be in an RRC idle mode (RRC_IDLE), an RRC inactive mode (RRC_INACTIVE), or an RRC connected mode (RRC_CONNECTED). The UE may store the mobility history information in VarMobilityHistoryReport of NR in case that the following conditions are satisfied.

Condition 1: Upon change of cell, consisting of PCell in RRC_CONNECTED or serving cell in RRC_IDLE or RRC_INACTIVE (for NR cell), to another NR or E-UTRA or when entering out of service from NR cell Condition 2: Upon entering NR (in RRC_CONNECTED or RRC_IDLE or RRC_INACTIVE) while previously out of service and/or using another RAT except E-UTRA Condition 3: Upon entering NR (in RRC_CONNECTED or RRC_IDLE or RRC_INACTIVE) while using E-UTRA In case that the UE satisfies condition 1, and stores mobility history information in varMobilityHistoryReport of NR, the UE may include an entry in variable VarMobilityHistoryReport possibly after removing the oldest entry, if necessary, according to following.

If the global cell identity of the previous PCell/serving cell is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

In case that the UE satisfies condition 2, and stores the mobility history information in the VarMobilityHistoryReport of NR, the UE may include an entry in variable VarMobilityHistoryReport possibly after removing the oldest entry, if necessary, according to following.

The UE may set the field timeSpent of the entry as the time outside NR except using E-UTRA.

If condition 2 is satisfied, the UE according to an embodiment of the disclosure may propose to store both the time spent in out of service and the time when another RAT except E-UTRA is used in the timeSpent field. As an example, another RAT except E-UTRA may mean UTRA. That is, since the time spent in another RAT except the E-UTRA can be stored in the mobility history information of the UE, the mobility history information of the UE may become more accurate.

In case that the UE satisfies condition 3, and stores the mobility history information in the VarMobilityHistoryReport of the NR, the UE may include an entry in variable VarMobilityHistoryReport possibly after removing the oldest entry, if necessary, according to following.

If the global cell identity of the previous PCell/serving cell (information about E-UTRA cell) is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

If condition 3 is satisfied, the UE according to an embodiment of the disclosure may be featured to store only the latest E-UTRA cell information in the VarMobilityHistoryReport of the NR. As an example, in case of changing a cell from E-UTRA cell a to E-UTRA cell b, and changing the cell from E-UTRA cell b to an NR cell, the UE may be featured to store only information about E-UTRA cell b in the VarMobilityHistoryReport. In this case, since information about E-UTRA cell a is not stored, the mobility history information of the UE may be inaccurate, but it is advantageous that the UE can separately manage the VarMobilityHistoryReport of the LTE and the VarMobilityHistoryReport of the NR. That is, since the information about E-UTRA cell a is stored in the VarMobilityHistoryReport for the LTE and only the information about E-UTRA cell b is stored in the VarMobilityHistoryReport of the NR, the implementation efficiency for the UE that stores the mobility history information can be enhanced. As an example, in order to reflect the real mobility history information of the UE, the UE is not required to rearrange the order of the VarMobilityHistoryReport for the LTE and the VarMobilityHistoryReport for the NR.

With reference to FIG. 10, the UE may store the mobility history information in the VarMobilityHistoryReport of the NR in the above-described operations through operations 1005 to 1050. As an example, the UE may store at least one of the following information in the VarMobilityHistoryReport of the NR.

Global cell identity, or a carrier frequency and a physical cell identity for NR cell 1, and time 10 s spent in NR cell 1 (1005)

Global cell identity, or a carrier frequency and a physical cell identity for NR cell 2, and time 5 s spent in NR cell 2 (1010)

Global cell identity, or a carrier frequency and a physical cell identity for E-UTRA cell 2, and time 2 s spent in E-UTRA cell 2 (1020)

Global cell identity, or a carrier frequency and a physical cell identity for NR cell 3, and time 3 s spent in NR cell 3 (1025)

Total time 12 s spent in UTRA cell 1 and out of service (1040 and 1045)

For reference, the UE according to an embodiment of the disclosure may be featured not to include the following information in the VarMobilityHistoryReport of the NR.

Global cell identity, or a carrier frequency and a physical cell identity for E-UTRA cell 1, and time 10 s spent in E-UTRA cell 1 (1015)

Time 5 s spent in out of service (1030)

Global cell identity, or a carrier frequency and a physical cell identity for E-UTRA cell 3, and time 10 s spent in E-UTRA cell 3 (1040)

At operation 1050, the UE in the RRC connected mode may be connected to NR cell 4 as PCell (primary cell).

At operation 1055, the UE may receive a UE information request message including mobilityHistoryReportReq from an NR base station. If mobilityHistoryReportReq is set to true, the UE, at operation 1060, may include the mobilityHistoryReport and set it to include entries from VarMobilityHistoryReport.

At operation 1065, if necessary, the UE may remove the oldest entry value, if possible, from the current cell (e.g., NR cell 4), and may include the global cell identity for the current cell (NR cell 4) for entries present in the VarMobilityHistoryReport and the time spent in NR cell 4 in the mobilityHistoryReport.

At operation 1070, the UE may include the above-described mobilityHistoryReport in the UE information response message and may transmit the UE information response message to the NR base station.

Figure 11:
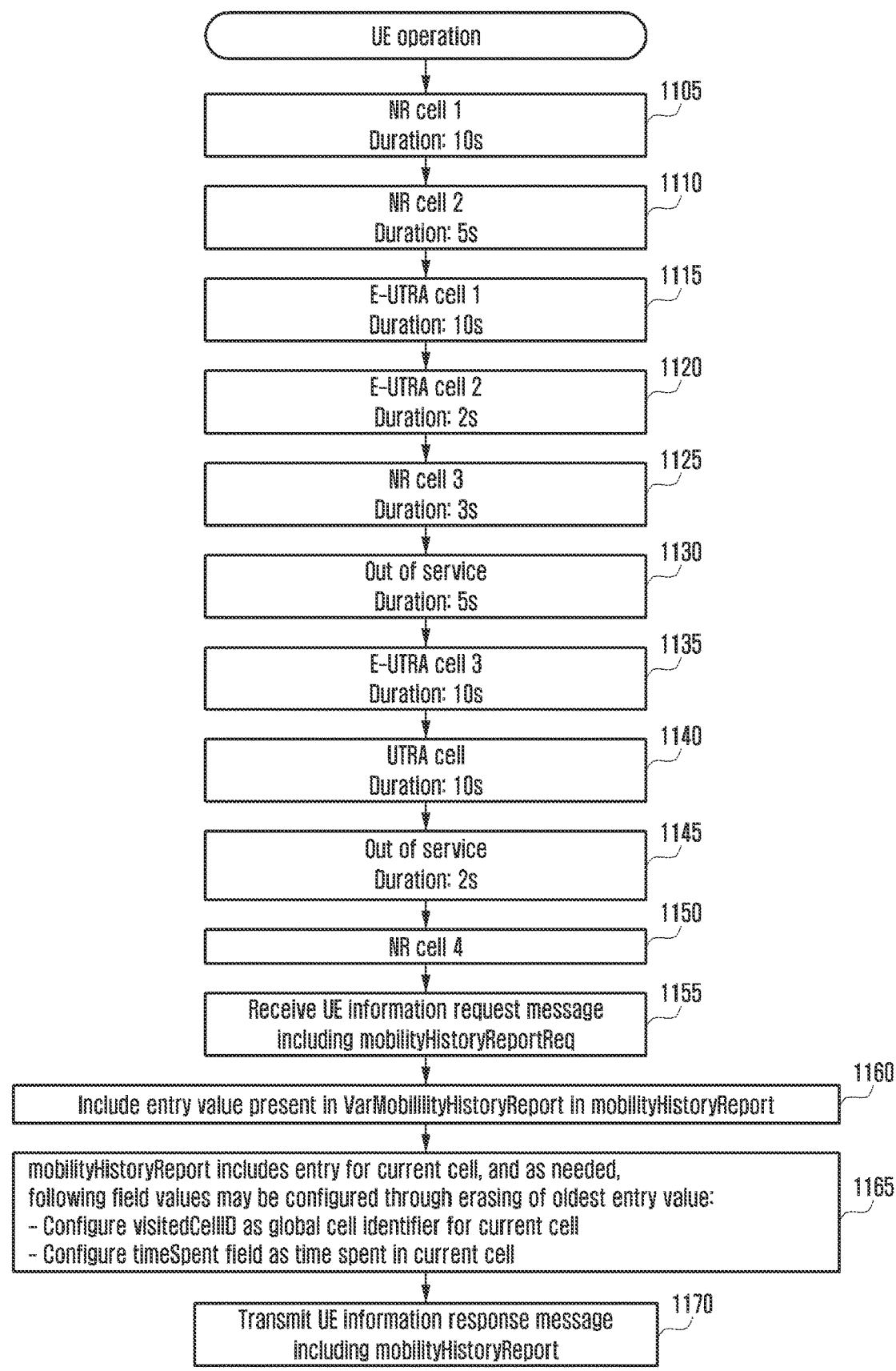
FIG. 11 is a diagram illustrating an operation of a UE for reporting mobility history information to an NR base station in a next-generation mobile communication system according to an embodiment of the disclosure.

FIG. 11 is a diagram illustrating an operation of a UE for reporting mobility history information to an NR base station in a next-generation mobile system according to an embodiment of the disclosure.

A UE that supports storage of mobility history information may enter an out of service state (e.g., the UE does not camp on or access any cell, i.e., the UE is in any cell selection state, or does not camp on any suitable cell or any acceptable cell) in case that the cell is changed through a cell selection process, a cell reselection process, or a handover process. The UE may be in an RRC idle mode (RRC_IDLE), an RRC inactive mode (RRC_INACTIVE), or an RRC connected mode (RRC_CONNECTED). The UE may store the mobility history information in VarMobilityHistoryReport of NR in case that the following conditions are satisfied.

Condition 1: Upon change of cell, consisting of PCell in RRC_CONNECTED or serving cell in RRC_IDLE or RRC_INACTIVE (for NR cell), to another NR or E-UTRA or when entering out of service from NR cell Condition 2: Upon entering NR (in RRC_CONNECTED or RRC_IDLE or RRC_INACTIVE) while previously out of service Condition 3: Upon entering NR (in RRC_CONNECTED or RRC_IDLE or RRC_INACTIVE) while using E-UTRA Condition 4: Upon change of cell, consisting of PCell in RRC_CONNECTED or serving cell in RRC_IDLE or RRC_INACTIVE to another E-UTRA or when entering out of service In case that the UE satisfies condition 1, and stores mobility history information in varMobilityHistoryReport of NR, the UE may include an entry in variable VarMobilityHistoryReport possibly after removing the oldest entry, if necessary, according to following.

If the global cell identity of the previous PCell/serving cell is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

In case that the UE satisfies condition 2, and stores the mobility history information in the VarMobilityHistoryReport of NR, the UE may include an entry in variable VarMobilityHistoryReport possibly after removing the oldest entry, if necessary, according to following.

The UE may set the field timeSpent of the entry as the time spent out of service.

In case that the UE satisfies condition 3, and stores mobility history information in the VarMobilityHistoryReport of NR, the UE may include an entry in variable VarMobilityHistoryReport possibly after removing the oldest entry, if necessary, according to following.

If the global cell identity of the previous PCell/serving cell (information about E-UTRA cell) is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

In case that the UE satisfies condition 4, and stores the mobility history information in the VarMobilityHistoryReport of NR, the UE may include an entry in variable VarMobilityHistoryReport possibly after removing the oldest entry, if necessary, according to following.

If the global cell identity of the previous PCell/serving cell (information about E-UTRA cell) is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

With reference to FIG. 11, the UE may store the mobility history information in the VarMobilityHistoryReport of the NR in the above-described operations through operations 1105 to 1150. As an example, the UE may store at least one of the following information in the VarMobilityHistoryReport of the NR.

Global cell identity, or a carrier frequency and a physical cell identity for NR cell 1, and time 10 s spent in NR cell 1 (1105)

Global cell identity, or a carrier frequency and a physical cell identity for NR cell 2, and time 5 s spent in NR cell 2 (1110)

Global cell identity, or a carrier frequency and a physical cell identity for E-UTRA cell 1, and time 10 s spent in E-UTRA cell 1 (1115)

Global cell identity, or a carrier frequency and a physical cell identity for E-UTRA cell 2, and time 2 s spent in E-UTRA cell 2 (1120)

Global cell identity, or a carrier frequency and a physical cell identity for NR cell 3, and time 3 s spent in NR cell 3 (1125)

Time 2 s spent in out of service (1145)

For reference, the UE according to an embodiment of the disclosure may be featured not to include the following information in the VarMobilityHistoryReport of the NR.

Time 5 s spent in out of service (1130)

Global cell identity, or a carrier frequency and a physical cell identity for E-UTRA cell 3, and time 10 s spent in E-UTRA cell 3 (1135)

Time 10 s spent in UTRA cell 1 (1140)

At operation 1150, the UE in the RRC connected mode may be connected to NR cell 4 as PCell (primary cell).

At operation 1155, the UE may receive a UE information request message including mobilityHistoryReportReq from an NR base station. If mobilityHistoryReportReq is set to true, the UE, at operation 1160, may include the mobilityHistoryReport and set it to include entries from VarMobilityHistoryReport.

At operation 1165, if necessary, the UE may remove the oldest entry value, if possible, from the current cell (e.g., NR cell 4), and may include the global cell identity for the current cell (NR cell 4) for entries present in the VarMobilityHistoryReport and the time spent in NR cell 4 in the mobilityHistoryReport.

At operation 1170, the UE may include the above-described mobilityHistoryReport in the UE information response message, and may transmit the UE information response message to the NR base station.

Figure 12:
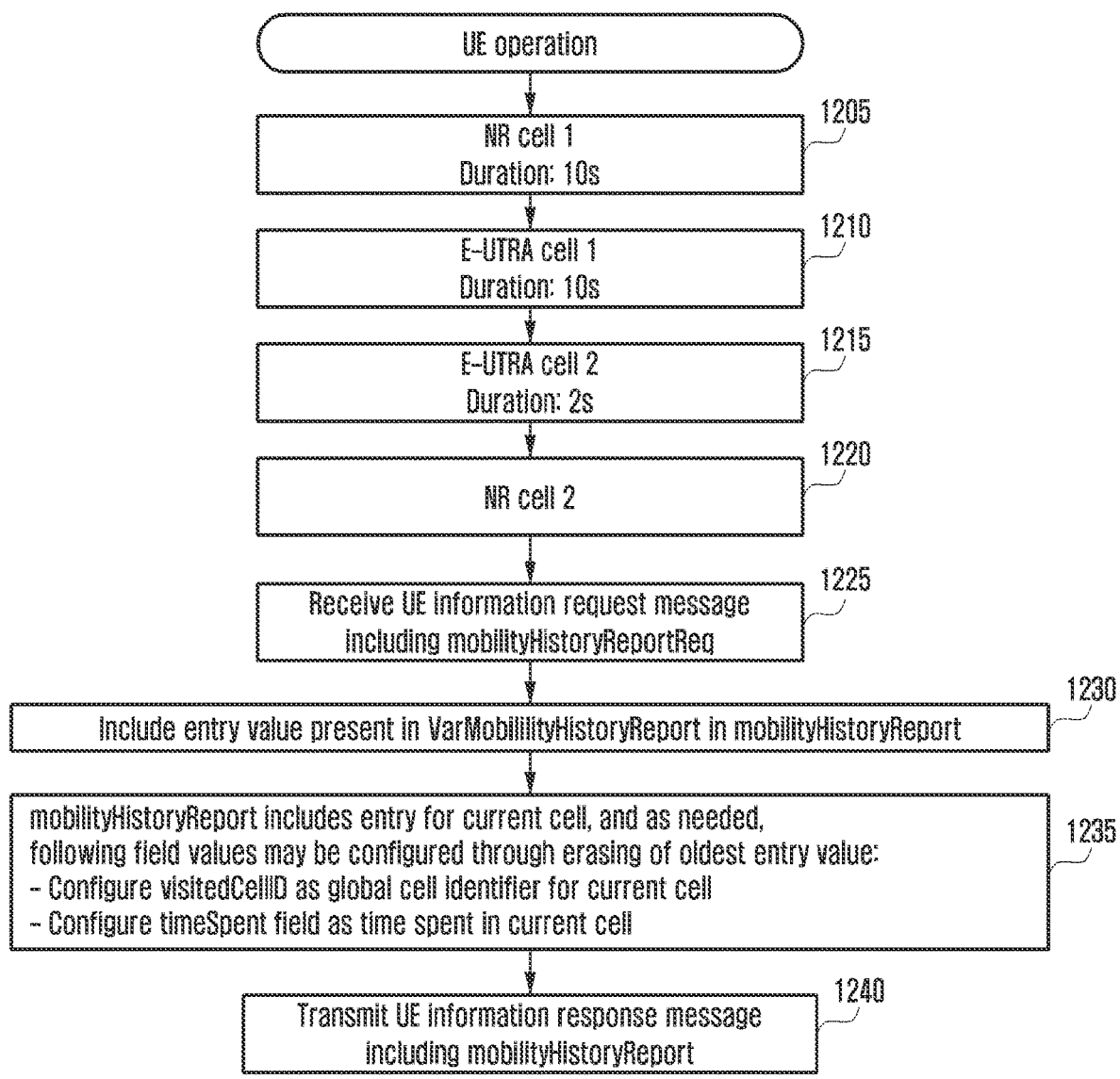
FIG. 12 is a diagram illustrating an operation of a UE for reporting mobility history information to an NR base station in a next-generation mobile communication system according to an embodiment of the disclosure.

FIG. 12 is a diagram illustrating an operation of a UE for reporting mobility history information to an NR base station in a next-generation mobile system according to an embodiment of the disclosure.

A UE that supports storage of mobility history information may enter an out of service state (e.g., the UE does not camp on or access any cell, i.e., the UE is in any cell selection state, or does not camp on any suitable cell or any acceptable cell) in case that the cell is changed through a cell selection process, a cell reselection process, or a handover process. The UE may be in an RRC idle mode (RRC_IDLE), an RRC inactive mode (RRC_INACTIVE), or an RRC connected mode (RRC_CONNECTED). The UE may store the mobility history information in VarMobilityHistoryReport of NR in case that the following conditions are satisfied.

Condition 1: Upon change of cell, consisting of PCell in RRC_CONNECTED or serving cell in RRC_IDLE or RRC_INACTIVE (for NR cell), to another NR or E-UTRA or when entering out of service from NR cell Condition 2: Upon entering NR (in RRC_CONNECTED or RRC_IDLE or RRC_INACTIVE) while using E-UTRA In case that the UE satisfies condition 1, and stores mobility history information in varMobilityHistoryReport of NR, the UE may include an entry in variable VarMobilityHistoryReport possibly after removing the oldest entry, if necessary, according to following.

If the global cell identity of the previous PCell/serving cell is available, the UE may include the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

In case that the UE satisfies condition 2, and stores the mobility history information in the VarMobilityHistoryReport of NR, the UE may include an entry in variable VarMobilityHistoryReport possibly after removing the oldest entry, if necessary, according to following.

The global cell identity or the carrier frequency and the physical cell identity of the latest E-UTRA cell before the entry of the NR cell may be stored in the visitedCellId field, and the total time spent in out of the NR (that means the time spent in the inter-RAT cell and the time spent in out of service) may be stored in the timeSpent field. If the total time spent in out of the NR is stored in the timeSpent field, it is advantageous that the base station can identify the total time for mobility of the UE before the entry of the NR cell. Further, the global cell identity or the carrier frequency and the physical cell identity of the latest E-UTRA cell before the entry of the NR cell may be stored in the visitedCellId field, and the total time spent in the E-UTRA cell and in out of service (the time spent in the E-UTRA cell and the time spent in out of service) may be stored in the timeSpent field. If the total time spent in the E-UTRA cell and in out of time is stored in the timeSpent field, the base station may grasp the mobility of the UE more inaccurately through the identification of only the time spent in the E-UTRA cell and the time spent in out of service before the entry of the NR cell, but the UE does not store the time spent in another RAT except the E-UTRA cell in the VarMobilityHistoryReport of the NR, and thus it is advantageous that implementation of the UE that stores the mobility history information is facilitated. Further, the global cell identity or the carrier frequency and the physical cell identity of the latest E-UTRA cell before the entry of the NR cell may be stored in the visitedCellId field, and the total time spent in the E-UTRA cell (the time spent in the E-UTRA cell) may be stored in the timeSpent field. If only the total time spent in the E-UTRA cell is stored in the timeSpent field, the base station may grasp the mobility of the UE more inaccurately through the identification of only the time spent in the E-UTRA cell before the entry of the NR cell, but the UE does not store the time spent in out of service and the time spent in the inter-RAT cell except the E-UTRA in the VarMobilityHistoryReport of the NR, and thus it is advantageous that implementation of the UE that stores the mobility history information is facilitated.

With reference to FIG. 12, the UE may store the mobility history information in the VarMobilityHistoryReport of the NR in the above-described operations through operations 1205 to 1220. As an example, the UE may store at least one of the following information in the VarMobilityHistoryReport of the NR.

Global cell identity, or a carrier frequency and a physical cell identity for NR cell 1, and time 10 s spent in NR cell 1 (1205)

Global cell identity, or a carrier frequency and a physical cell identity for NR cell 2, and total time 12 s spent in E-UTRA cell 1 and E-UTRA cell 2 (1210 and 1215)

At operation 1220, the UE in the RRC connected mode may be connected to NR cell 2 as PCell (primary cell).

At operation 1225, the UE may receive a UE information request message including mobilityHistoryReportReq from the NR base station. If mobilityHistoryReportReq is set to true, the UE, at operation 1230, may include the mobilityHistoryReport and set it to include entries from VarMobilityHistoryReport.

At operation 1235, if necessary, the UE may remove the oldest entry value, if possible, from the current cell (e.g., NR cell 2), and may include the global cell identity for the current cell (NR cell 2) for entries present in the VarMobilityHistoryReport and the time spent in NR cell 2 in the mobilityHistoryReport.

At operation 1240, the UE may include the above-described mobilityHistoryReport in the UE information response message and may transmit the UE information response message to the NR base station.

Figure 13:
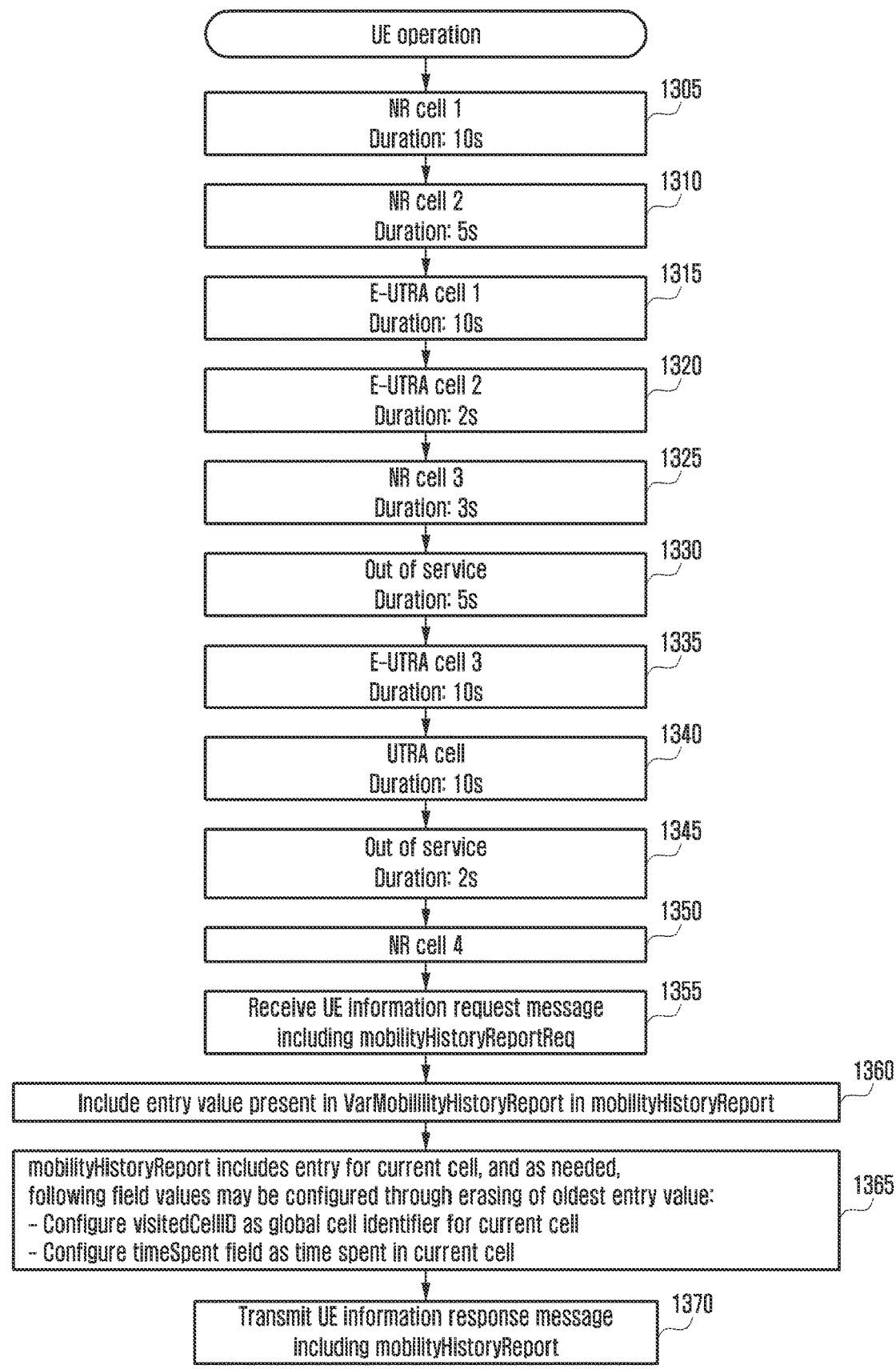
FIG. 13 is a diagram illustrating an operation of a UE for reporting mobility history information to an NR base station in a next-generation mobile communication system according to an embodiment of the disclosure.

FIG. 13 is a diagram illustrating an operation of a UE for reporting mobility history information to an NR base station in a next-generation mobile system according to an embodiment of the disclosure.

A UE that supports storage of mobility history information may enter an out of service state (e.g., the UE does not camp on or access any cell, i.e., the UE is in any cell selection state, or does not camp on any suitable cell or any acceptable cell) in case that the cell is changed through a cell selection process, a cell reselection process, or a handover process. The UE may be in an RRC idle mode (RRC_IDLE), an RRC inactive mode (RRC_INACTIVE), or an RRC connected mode (RRC_CONNECTED). The UE may store the mobility history information in VarMobilityHistoryReport of NR in case that the following conditions are satisfied.

Condition 1: Upon change of cell, consisting of PCell in RRC_CONNECTED or serving cell in RRC_IDLE or RRC_INACTIVE (for NR cell), to another NR or E-UTRA or when entering out of service from NR cell Condition 2: Upon entering NR (in RRC_CONNECTED or RRC_IDLE or RRC_INACTIVE) while previously out of service Condition 3: Upon entering NR (in RRC_CONNECTED or RRC_IDLE or RRC_INACTIVE) while using E-UTRA In case that the UE satisfies condition 1, and stores mobility history information in varMobilityHistoryReport of NR, the UE may include an entry in variable VarMobilityHistoryReport possibly after removing the oldest entry, if necessary, according to following.

If the global cell identity of the previous PCell/serving cell is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

In case that the UE satisfies condition 2, and stores the mobility history information in the VarMobilityHistoryReport of NR, the UE may include an entry in variable VarMobilityHistoryReport possibly after removing the oldest entry, if necessary, according to following.

The UE may set the field timeSpent of the entry as the time spent out of service.

In case that the UE satisfies condition 3, and stores the mobility history information in the VarMobilityHistoryReport of NR, the UE may include an entry in variable VarMobilityHistoryReport possibly after removing the oldest entry, if necessary, according to following.

If the global cell identity of the previous PCell/serving cell (information about E-UTRA cell) is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

If the following conditions are satisfied, the UE may store the mobility history information in the VarMobilityHistoryReport of LTE, and may additionally report this when reporting the mobility history information of the UE to the NR base station.

Condition 4-1: Upon change of cell, consisting of PCell in RRC_CONNECTED or serving cell in RRC_IDLE, to another E-UTRA or inter-RAT cell or when entering out of service from E-UTRA cell (e.g., the UE in the RRC connected mode may mean PCell, and the UE in the RRC idle mode may mean the service cell)

Condition 4-2: Upon change of cell, consisting of PCell in RRC_CONNECTED or serving cell in RRC_IDLE or RRC_INACTIVE, to another E-UTRA or inter-RAT cell or when entering out of service from E-UTRA cell (e.g., the UE in the RRC connected mode may mean PCell, and the UE in the RRC idle mode or the UE in the RRC inactive mode may mean the service cell)

Condition 5-1: Upon entering E-UTRA (in RRC_CONNECTED or RRC_IDLE) while previously out of service and/or using another RAT except NR Condition 5-2: Upon entering E-UTRA (in RRC_CONNECTED or RRC_IDLE or RRC inactive mode) while previously out of service and/or using another RAT except NR If the UE stores the mobility history information in the VarMobilityHistoryReport of LTE in accordance with condition 4-1 or condition 4-2, the UE may include an entry in variable VarMobilityHistoryReport possibly after removing the oldest entry, if necessary, according to following.

If the global cell identity of the previous PCell/serving cell is available, the UE may store the global cell identity of that cell in the field visitedCellId of the entry. Else, the UE may include the physical cell identity and carrier frequency of that cell in the field visitedCellId of the entry. Further, the UE may set the field timeSpent of the entry as the time spent in the previous PCell/serving cell.

The difference between condition 4-1 and condition 4-2 is whether the UE stores the mobility history information occurring in the RRC inactive mode. The difference is that the UE that stores the mobility history information in VarMobilityHistoryReport in accordance with condition 4-1 does not store the mobility history information occurring in the RRC inactive mode in the VarMobilityHistoryReport, and the UE that stores the mobility history information in the VarMobilityHistoryReport in accordance with condition 4-2 stores the mobility history information occurring in the RRC inactive mode in the VarMobilityHistoryReport.

In case that the UE stores the mobility history information in the VarMobilityHistoryReport in accordance with condition 5-1 or condition 5-2, the UE may include an entry in variable VarMobilityHistoryReport possibly after removing the oldest entry, if necessary, according to following.

The UE may set the field timeSpent of the entry as the time spent outside E-UTRA. The time spent outside the E-UTRA may mean the time spent in out of service, or the time when another RAT that is not the E-UTRA cell or the NR cell is used, or the time spent in out of service and the time when another RAT that is not the E-UTRA cell or the NR cell is used.

The difference between condition 5-1 and condition 5-2 is whether the UE stores the mobility history information occurring in the RRC inactive mode. The difference is that the UE that stores the mobility history information in VarMobilityHistoryReport in accordance with condition 5-1 does not store the mobility history information occurring in the RRC inactive mode in the VarMobilityHistoryReport, and the UE that stores the mobility history information in the VarMobilityHistoryReport in accordance with condition 5-2 stores the mobility history information occurring in the RRC inactive mode in the VarMobilityHistoryReport. Accordingly, the UE that stores the mobility history information in the VarMobilityHistoryReport in accordance with condition 2-2 has the advantage of being capable of reporting more accurate mobility history information to the base station as compared with condition 2-1.

With reference to FIG. 13, the UE may store the mobility history information in the VarMobilityHistoryReport of the NR in the above-described operations through operations 1305 to 1350. As an example, the UE may store at least one of the following information in the VarMobilityHistoryReport of the NR.

Global cell identity, or a carrier frequency and a physical cell identity for NR cell 1, and time 10 s spent in NR cell 1 (1305)

Global cell identity, or a carrier frequency and a physical cell identity for NR cell 2, and time 5 s spent in NR cell 2 (1310)

Global cell identity, or a carrier frequency and a physical cell identity for E-UTRA cell 2, and time 2 s spent in E-UTRA cell 2 (1320)

Global cell identity, or a carrier frequency and a physical cell identity for NR cell 3, and time 3 s spent in NR cell 3 (1325)

Time 2 s spent in out of service (1345)

the UE may store the mobility history information in the VarMobilityHistoryReport of the LTE in the above-described operations through operations 1305 to 1350. As an example, the UE may store at least one of the following information in the VarMobilityHistoryReport of the LTE.

Global cell identity, or a carrier frequency and a physical cell identity for E-UTRA cell 1, and time 10 s spent in E-UTRA cell 1 (1315)

Time 5 s spent in out of service (1330)

Global cell identity, or a carrier frequency and a physical cell identity for E-UTRA cell 3, and time 10 s spent in E-UTRA cell 3 (1335)

Time 10 s spent in UTRA cell 1 (1340)

At operation 1350, the UE in the RRC connected mode may be connected to NR cell 4 as PCell (primary cell).

At operation 1355, the UE may receive a UE information request message including mobilityHistoryReportReq from an NR base station. If mobilityHistoryReportReq is set to true, the UE, at operation 1360, may include the mobilityHistoryReport and set it to include entries from VarMobilityHistoryReport. In addition, the entry value in the mobilityHistoryReport of the LTE may be included in the mobilityHistoryReport of the NR, and may be included in an NR UE capability response message, or the mobilityHistoryReport of the LTE may be separately included in the mobilityHistoryReport of the LTE. In this case, the entry values may be arranged in order of steps 1305 to 1350, and then may be included in the NR UE capability response message.

At operation 1365, if necessary, the UE may remove the oldest entry value, if possible, from the current cell (e.g., NR cell 4), and may include the global cell identity for the current cell (NR cell 4) for entries present in the VarMobilityHistoryReport and the time spent in NR cell 4 in the VarMobilityHistoryReport.

At operation 1370, the UE may include the above-described mobilityHistoryReport in the UE information response message, and may transmit the UE information response message to the NR base station.

Figure 14:
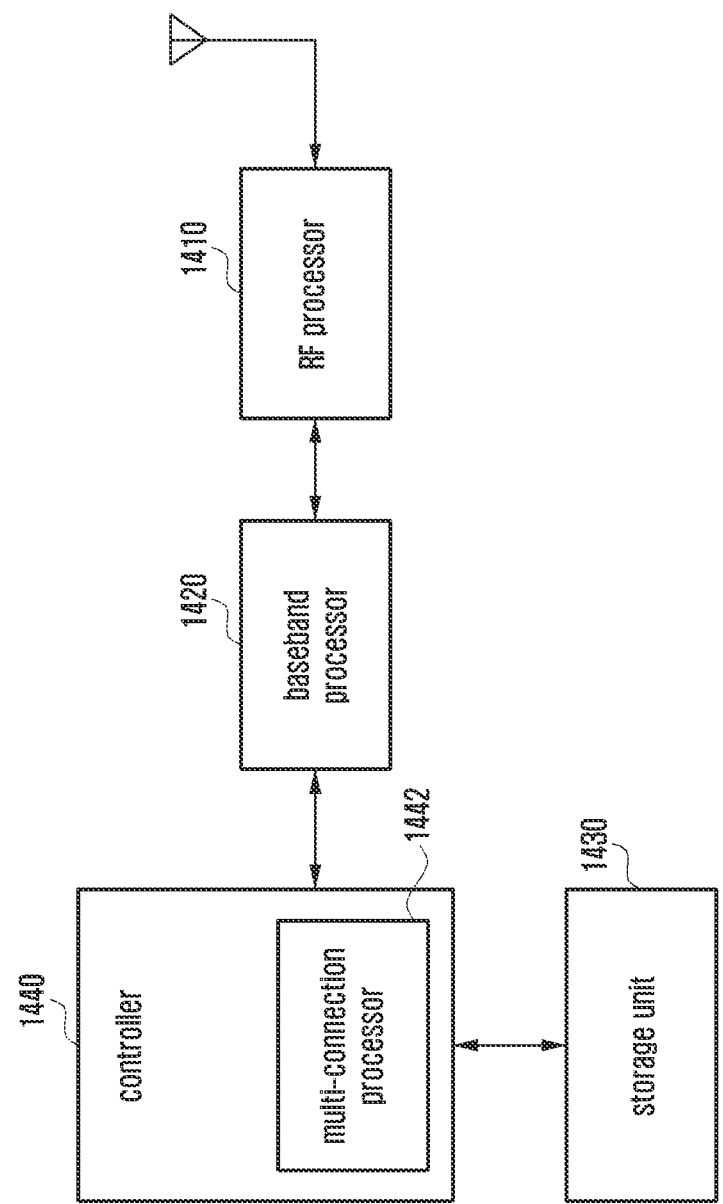
FIG. 14 is a diagram illustrating the internal structure of a UE according to an embodiment of the disclosure.

FIG. 14 is a block diagram illustrating the internal structure of a UE according to an embodiment of the disclosure.

With reference to the above drawing, the UE may include a radio frequency (RF) processor 1410, a baseband processor 1420, a storage unit 1430, and a controller 1440.

The RF processor 1410 may perform a function for transmitting and receiving a signal on a radio channel, such as signal band conversion and amplification. That is, the RF processor 1410 performs up-conversion of a baseband signal provided from the baseband processor 1420 into an RF-band signal to transmit the converted signal through an antenna, and performs down-conversion of the RF-band signal received through the antenna into a baseband signal. For example, the RF processor 1410 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Further, the RF processor 1410 may include a plurality of RF chains. Further, the RF processor 1410 may perform beamforming. For the beamforming, the RF processor 1410 may adjust phases and sizes of signals transmitted or received through the plurality of antennas or antenna elements. Further, the RF processor 1410 may perform MIMO, and may receive several layers during performing of the MIMO operation.

The baseband processor 1420 performs a conversion function between a baseband signal and a bit string in accordance with the physical layer standard of the system. For example, during data transmission, the baseband processor 1420 generates complex symbols by encoding and modulating a transmitted bit string. Further, during data reception, the baseband processor 1420 restores a received bit string by demodulating and decoding the baseband signal provided from the RF processor 1410. For example, in case of following an orthogonal frequency division multiplexing (OFDM) method, during data transmission, the baseband processor 1420 generates complex symbols by encoding and modulating a transmitted bit string, performs mapping of the complex symbols onto subcarriers, and then configures OFDM symbols through the inverse fast Fourier transform (IFFT) operation and cyclic prefix (CP) insertion. Further, during data reception, the baseband processor 1420 divides the baseband signal being provided from the RF processor 1410 in the unit of OFDM symbols, restores the signals mapped onto the subcarriers through the fast Fourier transform (FFT) operation, and then restores the received bit string through demodulation and decoding.

The baseband processor 1420 and the RF processor 1410 transmit and receive the signals as described above. Accordingly, the baseband processor 1420 and the RF processor 1410 may be called a transmitter, a receiver, a transceiver, or a communication unit. Further, in order to support different radio access technologies, at least one of the baseband processor 1420 and the RF processor 1410 may include a plurality of communication modules. Further, in order to process signals of different frequency bands, at least one of the baseband processor 1420 and the RF processor 1410 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter wave (e.g., 60 GHz) band.

The storage unit 1430 stores therein a basic program for an operation of the UE, application programs, and data of configuration information. In particular, the storage unit 1430 may store information related to a second connection node that performs wireless communication by using a second radio access technology. Further, the storage unit 1430 provides stored data in accordance with a request from the controller 1440.

The controller 1440 controls the overall operation of the UE. For example, the controller 1440 transmits and receives signals through the baseband processor 1420 and the RF processor 1410. Further, the controller 1440 records or reads data in or from the storage unit 1430. For this, the controller 1440 may include at least one processor. For example, the controller 1440 may include a communication processor (CP) performing a control for communication and an application processor (AP) controlling an upper layer, such as an application program.

Figure 15:
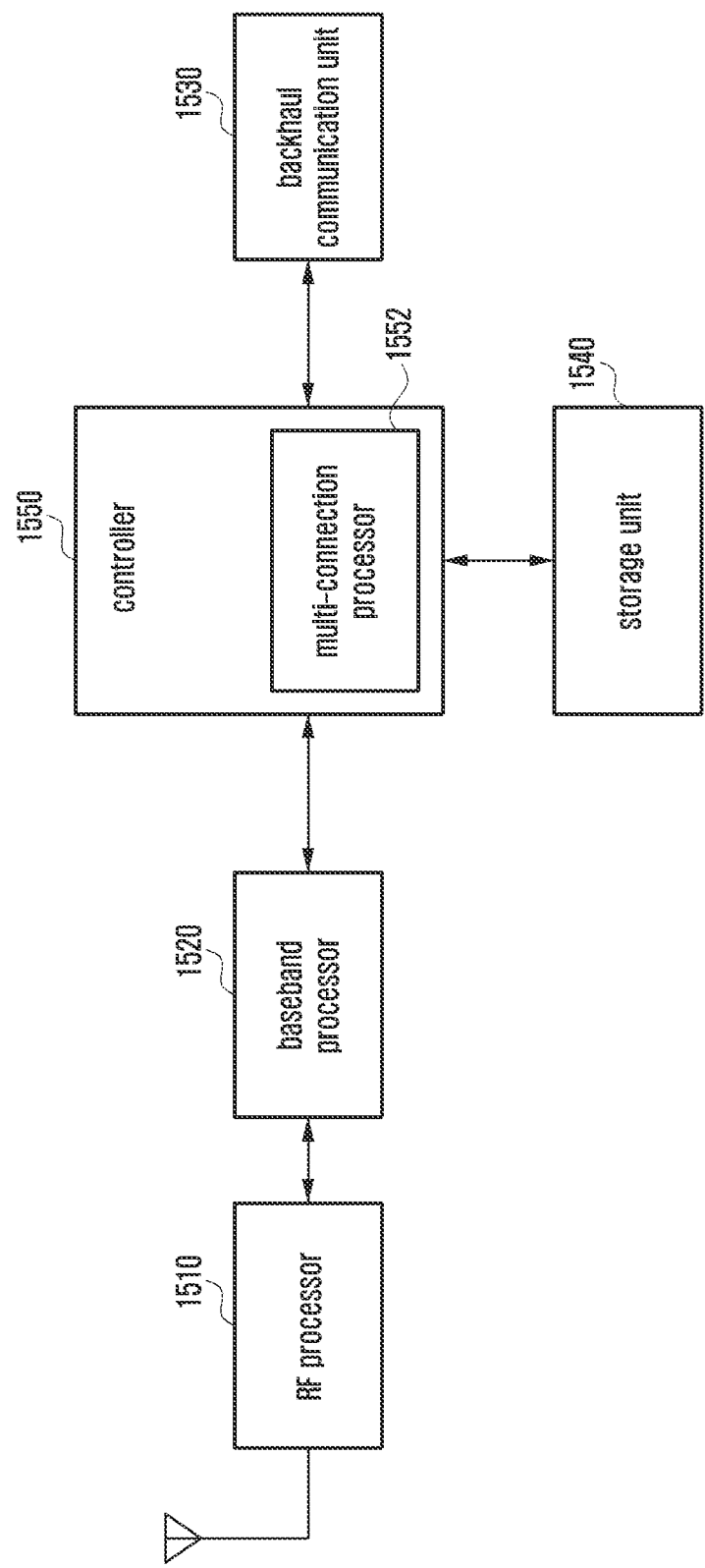
FIG. 15 is a diagram illustrating the configuration of an NR base station according to an embodiment of the disclosure.

FIG. 15 is a block diagram illustrating the configuration of an NR base station according to an embodiment of the disclosure.

As illustrated in the drawing, a base station is configured to include an RF processor 1510, a baseband processor 1520, a backhaul communication unit 1530, a storage unit 1540, and a controller 1550.

The RF processor 1510 performs a function for transmitting and receiving a signal on a radio channel, such as signal band conversion and amplification. That is, the RF processor 1510 performs up-conversion of a baseband signal provided from the baseband processor 1520 into an RF-band signal to transmit the converted signal through an antenna, and performs down-conversion of the RF-band signal received through the antenna into a baseband signal. For example, the RF processor 1510 may include a transmission filter, a reception filter, an amplifier, a mixer, an oscillator, a DAC, and an ADC. Although only one antenna is illustrated in FIG. 15, the first access node may be provided with a plurality of antennas. Further, the RF processor 1510 may include a plurality of RF chains. Further, the RF processor 1510 may perform beamforming. For the beamforming, the RF processor 1510 may adjust phases and sizes of signals transmitted or received through the plurality of antennas or antenna elements. The RF processor 1510 may perform down MIMO operation through transmission of one or more layers.

The baseband processor 1520 performs conversion function between a baseband signal and a bit string in accordance with the physical layer standard of the first radio access technology. For example, during data transmission, the baseband processor 1520 generates complex symbols by encoding and modulating a transmitted bit string. Further, during data reception, the baseband processor 1520 restores a received bit string by demodulating and decoding the baseband signal provided from the RF processor 1510. For example, in case of following an OFDM method, during data transmission, the baseband processor 1520 generates complex symbols by encoding and modulating a transmitted bit string, performs mapping of the complex symbols to subcarriers, and then configures OFDM symbols through the IFFT operation and CP insertion. Further, during data reception, the baseband processor 1520 divides the baseband signal provided from the RF processor 1510 in the unit of OFDM symbols, restores the signals mapped to the subcarriers through the FFT operation, and then restores the received bit string through demodulation and decoding. The baseband processor 1520 and the RF processor 1510 transmit and receive the signals as described above. Accordingly, the baseband processor 1520 and the RF processor 1510 may be called a transmitter, a receiver, a transceiver, a communication unit, or a wireless communication unit.

The backhaul communication unit 1530 provides an interface for performing communication with other nodes in the network. That is, the backhaul communication unit 1530 converts a bit string being transmitted from the main base station to other nodes, for example, an auxiliary base station and a core network, into a physical signal, and converts the physical signal being received from other nodes into a bit string.

The storage unit 1540 stores therein a basic program for an operation of the main base station, application programs, and data of configuration information. In particular, the storage unit 1540 may store information on a bearer allocated to the connected UE and the measurement result reported from the connected UE. Further, the storage unit 1540 may store information that becomes a basis of determination whether to provide or suspend a multi-connection to the UE. Further, the storage unit 1540 provides stored data in accordance with a request from the controller 1550.

The controller 1550 controls the overall operation of the base station. For example, the controller 1550 transmits and receives signals through the baseband processor 1520 and the RF processor 1510 or through the backhaul communication unit 1530. Further, the controller 1550 records or reads data in or from the storage unit 1540. For this, the controller 1550 may include at least one processor.

Meanwhile, embodiments of the disclosure that are disclosed in the specification and drawings are merely for easy explanation of the technical contents of the embodiments of the disclosure and proposal of specific examples to help understanding of the embodiments of the disclosure, but are not intended to limit the scope of the embodiments of the disclosure. That is, it will be apparent to those of ordinary skill in the art to which the disclosure pertains that other modifications can be embodied based on the technical idea of the disclosure. Further, as needed, the embodiments may be operated in combination with each other.

Figure 16:
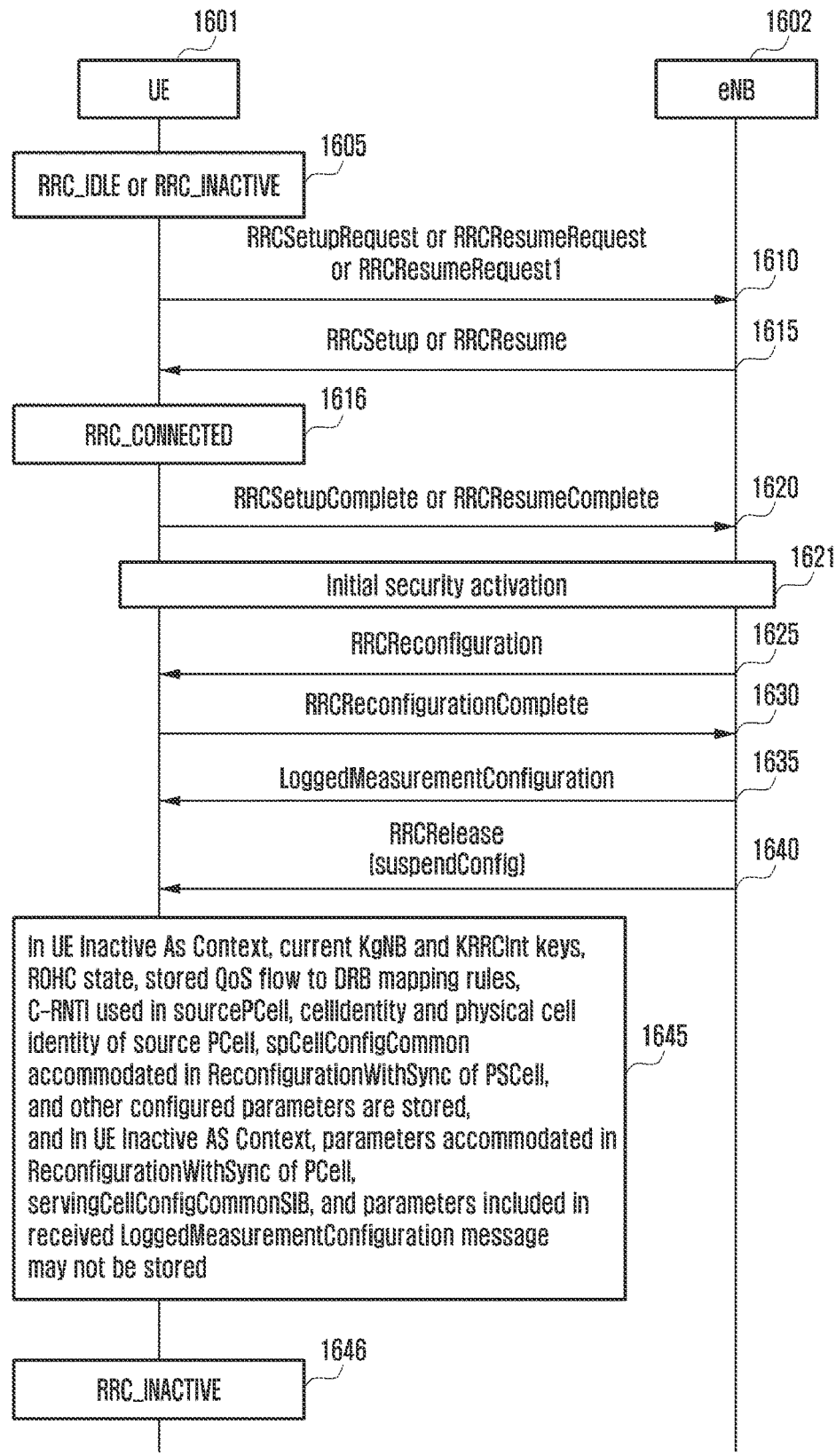
FIG. 16 is a diagram illustrating an operation between a UE and a base station for processing a logged measurement configuration in case that the UE is transitioned to an RRC inactive mode in a next-generation mobile communication system according to an embodiment of the disclosure.

FIG. 16 is a diagram illustrating an operation between a UE and a base station for processing a logged measurement configuration in case that the UE is transitioned to an RRC inactive mode in a next-generation mobile communication system according to an embodiment of the disclosure.

With reference to FIG. 16, a UE 1601 may be in an RRC idle mode (RRC_IDLE) or an RRC inactive mode (RRC_INACTIVE).

The UE 1601 in the RRC idle mode may transmit an RRC connection setup request message ((RRCSetupRequest) to a base station in order to perform an RRC connection setup procedure with the base station 1602 (1610). In response to this, the base station having received the RRC connection setup request message may transmit an RRC connection setup message (RRCSetup) to the UE (1615). The UE having received the RRC connection setup message may apply this, and may be transitioned to the RRC connected mode (1616). Further, the UE in the RRC connected mode may transmit an RRC connection setup complete message (RRCSetupComplete) to the base station (1620).

The UE 1601 in the RRC inactive mode may transmit, to the base station, an RRC connection resume request message or an RRC connection resume request 1 message (RRCResumeRequest or RRCResumeRequest1) to perform an RRC connection resume procedure with the base station 1602 (1610). In response to this, the base station having received the RRC connection resume request message may transmit an RRC connection resume message (RRCResume) to the UE (1615). The UE having received the RRC connection resume message may apply this, and may be transitioned to the RRC connected mode (1616). Further, the UE in the RRC connected mode may transmit an RRC connection resume complete message (RRCResumeComplete) to the base station (1620).

The UE 1601 that has not yet made security settings may perform an initial security activation procedure with the base station 1602 (1621). As an example, the UE that has not yet made security settings may mean a UE that has been switched from the RRC idle mode to the RRC connected mode. Specifically, the UE 1601 may transmit a security mode command message (SecurityModeCommand) to the base station 1602, and in response to this, the base station may transmit a security mode complete message (SecurityModeComplete) to the UE.

At operation 1625, in order to perform an RRC connection reconfiguration procedure, the base station 1602 may transmit an RRC connection reconfiguration message (RRCReconfiguration) to the UE 1601 in the RRC connected mode. The UE may apply the received RRC connection reconfiguration message, and in response to this, may transmit an RRC connection reconfiguration complete message (RRCReconfigurationComplete) to the base station (1630).

In order to start a logged measurement configuration procedure, the base station 1602 may transmit a LoggedMeasurementConfiguration message to the UE 1601 in the RRC connected mode (1635). The UE having received the LoggedMeasurementConfiguration message may perform the following series of processes.

- The UE may remove the logged measurement configuration and logged measurement information.
- If loggingDuration, loggingInterval, and areaConfiguration are included in VarLogMeasConfig, the UE may store them.
- If the LoggedMeasurementConfiguration message includes plmn-IdentityList, the UE may set RPLMN and PLMNs included in the plmn-IdentityList to a VarLogMeasReport as the plmn-IdentityList. If the LoggedMeasurementConfiguration message does not include the plmn-IdentityList, the UE may set the RPLMN in the VarLogMeasReport as the plmn-IdentityList.
- The UE may store, in the VarLogMeasReport, the received absoluteTimeInfo, traceReference, traceRecordingSessionRef, and tce-Id.
- If being included, the UE may store the received bt-NameList, wlan-NameList, sensor-NameList, and reportType in the VarLogMeasConfig.
- The UE may start a T330 timer with a timer value included in loggingDuration.

The ASN.1 structure for the LoggedMeasurementConfiguration is as in the following Table 4.

TABLE 4

LoggedMeasurement Configuration message

```
-- ASN1START
-- TAG-LOGGEDMEASUREMENTCONFIGURATION-START
LoggedMeasurementConfiguration-r16 ::= SEQUENCE {
    criticalExtensions                  CHOICE {
        loggedMeasurerentConfiguration-r16   LoggedMeasurementConfiguration-r16-IEs,
        criticalExtensionsFuture             SEQUENCE { }
    }
}
LoggedMeasurementConfiguration-r16-IEs ::= SEQUENCE {
    traceReference-r16              TraceReference-r16,
    traceRecordingSessionRef-r16    OCTET STRING (SIZE (2)),
    tce-Id-r16                      OCTET STRING (SIZE (1)),
    absoluteTimeInfo-r16            AbsoluteTimeInfo-r16,
    areaConfiguration-r16           AreaConfiguration-r16        OPTIONAL, --Need R
    plm-IdentityList-r16            PLMN-IdentityList2-r16       OPTIONAL, --Need R
    bt-Namelist-r16                 SetupRelease {BT-Namelist-r16}    OPTIONAL, --Need M
    wlan-Namelist-r16               SetupRelease {WLAN-Namelist-r16}  OPTIONAL, --Need M
    sensor-Namelist-r16             SetupRelease {Sensor-Namelist-r16} OPTIONAL, --Need M
    loggingDuration-r16             LoggingDuration-r16,
    reportType                      CHOICE {
        periodical                      LoggedPeriodicalReportConfig-r16,
        eventTriggered                  LoggedEventTriggerConfig-r16
    }
}
LoggedPeriodicalReportConfig-r16 ::=    SEQUENCE {
    loggingInterval=r16                 LoggingInterval-r16
}
LoggedEventTriggerConfig-r16 ::=        SEQUENCE {
    eventType-r16                       EventType-r16,
    loggingInterval-r16                 LoggingInterval-r16}
EventType-r16 ::= CHOICE {
    outOfCoverage  NULL,
    eventL1        SEQUENCE {
        l1-Threshold      MeasTriggerQuantity,
        hysteresis        Hysteresis,
        timeToTrigger     TimeToTrigger
    },
    ...
}
-- TAG-LOGGEDMEASUREMENTCONFIGURATION-STOP
-- ASN1STOP
```

■ LoggedMeasurement Configuration field descriptions

■ *absoluteTimeInfo*
Indicates the absolute time in the current cell.

■ *areaConfiguration*
Used to restrict the area in which the UE performs measurement logging to cells broadcasting either one of the included cell identities or one of the included tracking area codes/ frequencies.

■ *eventType*
The value outOfCoverage indicates the UE to perform logging of measurements when the UE enters any cell selection state, and the value eventL1 indicates the UE to perform logging of measurements when the triggering condition (similar as event A2 as specified in 5.5.4.3) as configured in the event is met for the camping cell in camped normally state.

■ *plmn-IdentityList*
Indicates a set of PLMNs defining when the UE performs measurement logging as well as the associated status indication and information retrieval i.e. the UE performs these actions when the RPLMN is part of this set of PLMNs. A PLMN-identity can be included only once, and in only one entry ofthe PLMN- IdentityInfoList ■ tce-Id
Parameter Trace Collection Entity Id: See TS 32.422 [52]

■ *traceRecording SessionRef*
Parameter Trace Recording Session Reference: See TS 32.422 [52].

■ *reportType*
Parameter configures the type of MDT configuration, specifically Periodic MDT conifguraiton or Event Triggerd MDT configurations.

For a specific reason (e.g., there is not data transmission/reception), the base station 1602 may transmit an RRC connection release message (RRCRelease) including suspend configuration information (suspendConfig) to the UE 1601 in the RRC connected mode (1604). At operation 1645, the UE may store, in UE Inactive AS Context, current KgNB and KRRCInt keys, ROHC state, stored QoS flow to DRB mapping rules, C RNTI used in source PCell, source PCell cellIdentity and physical cell identity, spCellConfigCommon accommodated in ReconfigurationWithSync of PSCell, and other configured parameters. In this case, the UE may not store, in the UE Inactive AS Context, parameters accommodated in ReconfigurationWithySync of PCell, servingCellConfigCommonSIB, and parameters included in the LoggedMeasurementConfiguration message received at operation 1635. Further, the UE may be transitioned to the RRC inactive mode (RRC_INACTVE) (1646).

The UE according to an embodiment of the disclosure is featured not to store the logged measurement configuration in the UE Inactive AS Context. The logged measurement configuration is configuration information being commonly applied to both the RRC inactive mode and the RRC idle mode, and since it is stored, updated, and managed in separate UE variables (e.g., VarLogMeasConfig and/or VarLogMeasReport), it is not required to be separately stored in the UE Inactive AS Context. That is, since the UE Inactive AS Context has a purpose of storing and using the RRC configuration information being used in the RRC connected mode (RRC_CONNECTED), it is not necessary to separately store the logged measurement configuration in the UE Inactive AS Context. If the logged measurement configuration is stored in the UE Inactive AS Context, there may exist values in actual UE variables (e.g., VarLogMeasConfig and/or VarLogMeasReport) and values different from those of the logged measurement configuration stored in the UE Inactive AS Contest, and this may cause later malfunction of the UE (e.g., the UE may report wrong logged measurement information to the base station). Accordingly, in the UE Inactive AS contest, other parameters except the logged measurement configuration may be stored.

Figure 17:
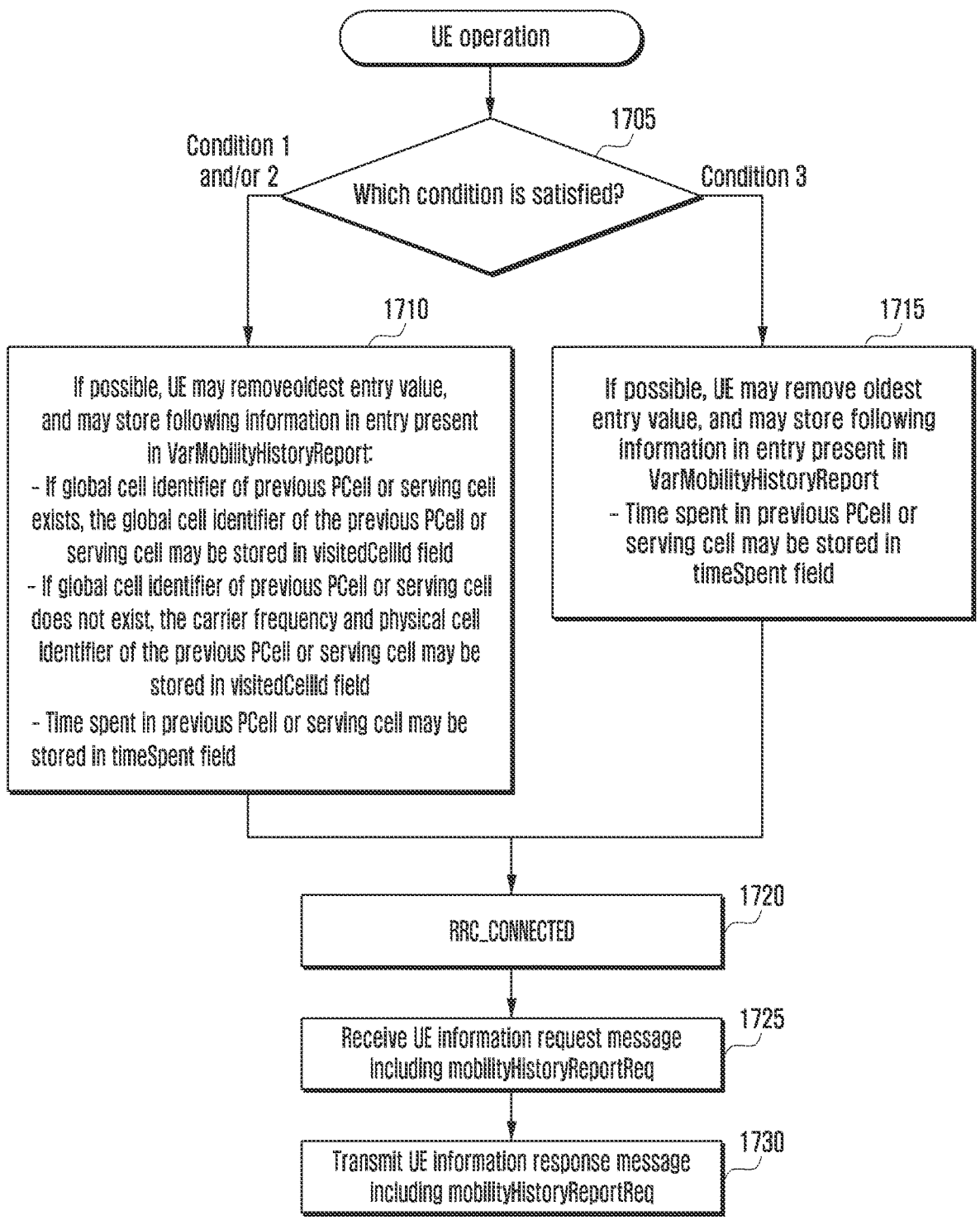
FIG. 17 is a diagram illustrating an operation of a UE for reporting mobility history information to an NR base station in a next-generation mobile communication system according to an embodiment of the disclosure.

FIG. 17 is a diagram illustrating an operation of a UE for reporting mobility history information to an NR base station in a next-generation mobile communication system according to an embodiment of the disclosure.

A UE that supports storage of mobility history information may enter a camped normally state (a state where the UE camps on a suitable cell for general usage), any cell selection state (a state where the UE does not camp on any cell), or a camped on any cell state (a state where the UE camps on an acceptable cell for limited services (emergency calls, ETWS and CMAS)) in case that the cell is changed through a cell selection process, a cell reselection process, or a handover process. The UE may store the mobility history information for the NR cell in an RRC idle mode (RRC_IDLE), an RRC inactive mode (RRC_INACTIVE), or an RRC connected mode (RRC_CONNECTED), Of course, the UE may store the mobility history information in the RRC inactive mode for the E-UTRA cell, and this may be determined in accordance with the UE capability or standard release. That is, in the contents to be described later, for convenience, it is assumed that the UE in the RRC inactive mode does not store the mobility history information. If the following conditions are satisfied, the UE may store the mobility history information in the VarMobilityHistoryReport of the NR.

Condition 1: Upon change of suitable cell (an NR suitable cell may mean PCell in case of the UE in the RRC connected mode, and may mean a serving cell in case of the UE in the RRC idle mode or the UE in the RRC inactive mode. Further, E-UTRA cell may mean PCell in case of the UE in the RRC connected mode, and may mean a serving cell in case of the UE in the RRC idle mode), consisting of PCell in RRC_CONNECTED or serving cell in RRC_INACTIVE (for NR cell) or in RRC_IDLE (for NR or E-UTRA cell), to another NR or E-UTRA cell Condition 2: When entering any cell selection state form camped normally state in NR or LTE Condition 3: Upon entering camped normally state in NR (in RRC_IDLE, RRC_INACTIVE, or RRC_CONNECTED) or E-UTRA (in RRC_IDLE or RRC_CONNECTED) while previously in any cell selection state or camped on any cell state in NR or LTE The UE may determine which of condition 1, condition 2, or condition 3 is satisfied (1705).

If the UE satisfies condition 1 or condition 2, and stores mobility history information in the VarMobilityHistoryReport of the NR, at operation 1710, the UE may include an entry in variable VarMobilityHistoryReport possibly after removing the oldest entry, if necessary, according to following If the global cell identity of the previous PCell/serving cell is available, the UE may include the global cell identity of that cell in the field visitedCellId of the entry. Else, if the global cell identity is not available, the UE may include the physical cell identity and carrier frequency of that cell in the field visitedCellId of the entry. Further, the UE may set the field timeSpent of the entry as the time spent in the previous PCell/serving cell.

If the UE satisfies condition 3, and stores the mobility history information in the VarMobilityHistoryReport of the NR, at operation 1715, the UE may include an entry in variable VarMobilityHistoryReport possibly after removing the oldest entry, if necessary, according to following The UE may set the field timeSpent of the entry as the time spent in any cell selection state and/or camped on any cell state in NR or LTE.

If condition 3 is satisfied, the UE according to an embodiment of the disclosure may store the time spent in any cell selection state and/or camped on any cell state in the timeSpent field for the NR or E-UTRA at the time when the UE is transitioned to the camped normally state (i.e., a state where the UE camps on the suitable cell), and at the time when the UE is transitioned to the camped on any cell state (i.e., a state where the UE camps on the acceptable cell), the UE may not store the any cell selection state and/or camped on any cell state in the timeSpent field separately for the NR cell or the E-UTRA cell. As an example, upon entering NR in RRC_IDLE, RRC_INACTIVE or RRC_CONNECTED or upon entering E-UTRA in RRC_IDLE or RRC_CONNECTED, the UE may include both the camped normally state and the camped on any cell state, and in this case, it may be disadvantageous that the UE stores the duplicate time.

T0: camped normally state
T1: any cell selection state
T2: camped on any cell state
T3: any cell state
T4: camped on any cell state
T5: camped normally state The UE according to an embodiment of the disclosure may store time (T5-T1) in the timeSpent field at time T5. However, since the UE that does not follow an embodiment of the disclosure may store the time (T2-T1) in the timeSpent field at time T2, may store time (T4-T1) in the timeSpent field at time T4, and may store time (T5-T1) in the timeSpent field at time T5, the UE may unnecessarily store the duplicate time (e.g., time (T2-T1) or time (T4-T1), and thus may report wrong mobility history information to the base station.

At operation 1720, the UE in the RRC connected mode may be connected to PCell (Primary cell) that is the NR cell.

At operation 1725, the UE may receive the UE information request message including the mobilityHistoryReportReq from the NR base station. If mobilityHistoryReportReq is set to true, at operation 1730, the UE may include the mobilityHistoryReport and set it to include entries from VarMobilityHistoryReport.

At operation 1730, as needed, the UE may remove the oldest entry value, if possible, for the current cell (e.g., PCell), and may include the global cell identity for the current cell and the time spent in PCell in the VarMobilityHistoryReport.

At operation 1730, the UE may include the above-described mobilityHistoryReport in the UE information response message, and may transmit the UE information response message to the NR base station.

The invention claimed is:

1. A method performed by a user equipment (UE) in a wireless communication system, the method comprising:
   identifying that the UE enters a camped normally state from an any cell selection state or a camped on any cell state;
   in case that the UE enters the camped normally state from the any cell selection state or the camped on any cell state, setting a time spent field to time information spent in at least one of the any cell selection state or the camped on any cell state; and
   transmitting, to a base station, mobility history report information including the time spent field.

2. The method of claim 1, wherein transmitting the mobility history report information comprises:
   receiving, from the base station, UE information request message including an indication indicating to report information on mobility history information; and
   based on the indication, transmitting, to the base station, a UE information response message including the mobility history report information.

3. The method of claim 1, wherein the mobility history report information further includes a cell identity (ID) of a visited cell.

4. The method of claim 1, wherein the mobility history report information includes the time spent field of an entry, after removing the oldest entry.

5. A method performed by a base station in a wireless communication system, the method comprising:
   transmitting, to a user equipment (UE), UE information request message including an indication indicating to report information on mobility history information; and
   based on the indication, receiving, from the UE, a UE information response message including mobility history report information,
   wherein the mobility history report information includes a time spent field, and
   wherein the time spent field is set to time information spent in at least one of an any cell selection state or a camped on any cell state to a camped normally state.

6. The method of claim 5, wherein the mobility history report information further includes a cell identity (ID) of a visited cell.

7. The method of claim 5, wherein the mobility history report information includes the time spent field of an entry, after removing the oldest entry.

8. A user equipment (UE) in a wireless communication system, the UE comprising:
   a transceiver; and
   a controller configured to:
      identify that the UE enters a camped normally state from an any cell selection state or a camped on any cell state,
      in case that the UE enters the camped normally state from the any cell selection state or the camped on any cell state, set a time spent field to time information spent in at least one of the any cell selection state or the camped on any cell state, and
      transmit, to a base station, a mobility history report information including the time spent field.

9. The UE of claim 8, wherein the controller is further configured to:
   receive, from the base station, UE information request message including an indication indicating to report information on mobility history information, and
   based on the indication, transmit, to the base station, a UE information response message including the mobility history report information.

10. The UE of claim 8, wherein the mobility history report information further includes a cell identity (ID) of a visited cell.

11. The UE of claim 8, wherein the mobility history report information includes the time spent field of an entry, after removing the oldest entry.

12. A base station in a wireless communication system, the base station comprising:
    a transceiver; and
    a controller configured to:
       transmit, to a user equipment (UE), UE information request message including an indication indicating to report information on mobility history information, and
       based on the indication, receive, from the UE, a UE information response message including mobility history report information,
    wherein the mobility history report information includes a time spent field, and
    wherein the time spent field is set to time information spent in at least one of an any cell selection state or a camped on any cell state to a camped normally state.

13. The base station of claim 12,
    wherein the mobility history report information further includes a cell identity (ID) of a visited cell, and
    wherein the mobility history report information includes the time spent field of an entry, after removing the oldest entry.

14. The method of claim 1, wherein the UE enters the camped normally state in a new radio (NR) or an evolved universal mobile telecommunication system (UMTS) terrestrial radio access network (E-UTRA) from the any cell selection state or the camped on any cell state in the NR or a long term evolution (LTE).

15. The UE of claim 8, wherein the UE enters the camped normally state in a new radio (NR) or an evolved universal mobile telecommunication system (UMTS) terrestrial radio access network (E-UTRA) from the any cell selection state or the camped on any cell state in the NR or a long term evolution (LTE).

* * * * *